United States Patent
Kim et al.

(10) Patent No.: US 8,525,790 B2
(45) Date of Patent: *Sep. 3, 2013

(54) NON-CONTACT SELECTION DEVICE

(75) Inventors: Dong-Jin Kim, Seoul (KR); Zeeno Joe, Hwaseong-si (KR)

(73) Assignee: Mtekvision Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,623

(22) Filed: Jun. 21, 2012

(65) Prior Publication Data

US 2012/0320247 A1 Dec. 20, 2012

Related U.S. Application Data

(63) Continuation of application No. 12/298,730, filed on Oct. 27, 2008, now Pat. No. 8,217,895.

(30) Foreign Application Priority Data

Apr. 28, 2006 (KR) .................. 10-2006-0039028
Jun. 2, 2006 (KR) .................. 10-2006-0050059
Jun. 14, 2006 (KR) .................. 10-2006-0053660

(51) Int. Cl.
*G06F 3/033* (2013.01)

(52) U.S. Cl.
USPC .................. 345/166; 345/157

(58) Field of Classification Search
None
See application file for complete search history.

(56) References Cited

U.S. PATENT DOCUMENTS 6,714,247 B1    3/2004    Numazaki et al.

FOREIGN PATENT DOCUMENTS

| JP | 9-237151 A | 9/1997 |
| JP | 2002-49455 A | 12/2002 |
| KR | 2003-0002937 A | 1/2003 |
| WO | WO 2005/059736 A1 | 6/2005 |

*Primary Examiner* — Paul Huber

(74) *Attorney, Agent, or Firm* — Birch, Stewart, Kolasch & Birch, LLP

(57) ABSTRACT

A non-contract selecting device is disclosed. The non-contract selecting device include a light source, emitting light to an outside; a camera unit, generating and outputting a video signal corresponding to an external video; a video data generating unit, generating video data corresponding to the video signal; and an identity unit, detecting a location of a detected area formed by light, reflected by pointing-means and inputted, of the light emitted from the video data in units of each frame, recognizing a moving locus of the detected area by comparing at least two continuous frames and generating and outputting corresponding change information. With the present invention, the function-selecting can be more quickly and easily and increase making the most use of elements.

41 Claims, 17 Drawing Sheets

Figure 10

| (x,y) | $0 < y < n/3$ | $n/3 < y < 2n/3$ | $2n/3 < y < n$ |
|---|---|---|---|
| $0 < x < m/3$ | P11 | P21 | P31 |
| $m/3 < x < 2m/3$ | P12 | P22 | P32 |
| $2m/3 < x < m$ | P13 | P23 | P33 |

NON-CONTACT SELECTION DEVICE

CROSS-REFERENCE TO RELATED APPLICATIONS

This application is a Continuation of copending application Ser. No. 12/298,730 filed on Oct. 27, 2008, which is the U.S. National Phase of PCT/KR2007/02126, filed Apr. 30, 2007, and which claims priority to Application No. 10-2006-0039028 filed in Korea, on Apr. 28, 2006, Application No. 10-2006-0050059 filed in Korea, on Jun. 2, 2006, and Application No. 10-2006-0053660 filed in Korea, on Jun. 14, 2006. The entire contents of all of the above applications are hereby incorporated by reference.

BACKGROUND

1. Technical Field

The present invention relates to a function selecting method by using a camera, more specifically to a device and method capable of non-contactly selecting a function by using a camera.

2. Description of the Related Art

Today's remarkable development of electronic and communication technologies allows a user to use various functions such as Internet surfing, video communication, moving picture or music playback, and satellite broadcast watching by using a digital home appliance (e.g. a computer and a digital camera) or a portable communication terminal. Accordingly, a key inputting method for efficiently selecting desired functions is requested for a user to enjoy more various functions.

The most favorite method of conventional function selecting methods is to directly manipulate a plurality buttons of key pads provided in various kinds of devices. In other words, the user presses a menu key, and then, manipulates a direction key (or cursor key) several times, to move a cursor to desired information item (e.g. an icon) displayed through an LCD screen and executes a desired function by selecting the information item located with the moved cursor by use of the selection key.

However, in accordance to the conventional function selecting method, it is requested to manipulate a button several times, in order to execute a user's desired function. Particularly, although limited functions are actually used as compared with enormous functions of today's digital devices, it is a troublesome work for the user to have to undergo the aforementioned complicated operation, in order to select a desired function.

Since the conventional functional selecting method must be also necessarily equipped with a key button for selecting a function, the conventional functional selecting method requests an additional molding operation for each key button. Accordingly, this additional molding operation causes to make its manufacturing process complicated and to increase its manufacturing unit price. Also, a settled area occupied by the key pad restricts to the size and design of the digital device.

Beside that, there can be provided a touch screen method through a display unit as the function selecting method. However, this method also leads to the increase of its manufacturing cost due to the equipment of a display unit capable of the touch screen.

SUMMARY

Accordingly, the present invention provides a device and method capable of non-contactly selecting a function that can allow a user to more easily and quickly select a function by remote-controlling a menu function by use of a camera.

The prevent invention provides a device and method capable of non-contactly selecting a function that can evoke user's interest, beyond the conventional simple function selecting method through the key button.

The prevent invention provides a device and method capable of non-contactly selecting a function that can maximize making the most use of elements by allowing an equipped camera to be universally used.

The prevent invention provides a device and method capable of non-contactly selecting a function that can reduce a manufacturing cost for a key pad and make its size minimized and its design varied by making the best use of the internal space of a digital device.

The prevent invention provides a device and method capable of non-contactly selecting a function that can determine a moving width of a pointer according to the distance spaced with directing means.

The prevent invention provides a device and method capable of non-contactly selecting a function that can not only reduce a manufacturing cost of a digital device by removing a key pad but also make its size minimized and its design varied by making the best use of the internal space of the digital device.

Other problems that the present invention solves will become more apparent through the following description.

To solve the above problems, an aspect of the present invention features an image signal processor, an application processor and a digital processing device, for performing a non-contact function.

According to an embodiment of the present invention, a digital device having a photographing function can include a light source, emitting light to an outside; a camera unit, generating and outputting a video signal corresponding to an external video; a video data generating unit, generating video data corresponding to the video signal; and an identity unit, detecting a location of a detected area formed by light, reflected by pointing-means and inputted, of the light emitted from the video data in units of each frame, recognizing a moving locus of the detected area by comparing at least two continuous frames and generating and outputting corresponding change information. Here, the change information is used as an input signal for function control and display control of the digital processing device.

It can be displayed on the change information that any one of a plurality of information items, displayed on a display unit of the digital processing device, is selected, or a mouse cursor moving corresponding to the change information can be displayed.

The identity unit can detect the size of the detected area, compare at least two continuous frames and generate and output change information corresponding to the size change of the detected area.

If the size of the detected area is changed by the pointing-means moved in a first direction, the change information can be recognized as a selecting command or an executing start command of an information item, corresponding to the moving locus, among a plurality of information items displayed on the display unit.

If the size of the detected area is changed by the pointing-means moved in a second direction reversely with respect to the first direction, the change information can be recognized as a selection releasing command of the selected information item.

If the first direction and the second direction are vertically with respect to the camera unit and the size of the detected area is changed at a rate identical to or larger than a predetermined rate, it can be recognized that the size of the detected area is changed.

If the size of the detected area is increased and then decreased or is decreased and then increased at a rate identical to or larger than a predetermined rate, it is predetermined that the change information can be recognized as a selection command of an information item located with a mouse cursor or a selection releasing command of a selected information item among a plurality of information items displayed on the display unit.

If the size of the detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

Also, the identity unit can detect the size of a first detected area and a second detected area in units of each frame corresponding to a plurality of pointing-means, respectively, compare at least two continuous frames and generate and output change information corresponding to the size changes of the first detected area and the second area.

If the size of the first detected area is increased and then decreased or is decreased and then increased at a rate identical to or larger than a predetermined rate, the change information can be recognized as a selection command of an information item located with a mouse cursor or a selection releasing command of a selected information item among a plurality of information items displayed on the display unit.

If the size of the second detected area is increased and then decreased or is decreased and then increased at a rate identical to or larger than a predetermined rate, the change information can be recognized as an option information displaying command of an information item located with a mouse cursor among a plurality of information items displayed on the display unit.

If the size of the first detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

The size of the detected area can be the area size of a figure formed by an outline of the detected area or the number of a pixel included in the detected area.

The light source can emit light having a predetermined wavelength or luminance to an outside. The identity unit can detect a location of the detected area from the video data by using the wavelength or the luminance.

The device can further include a key input unit, having at least one key button. Here, the light source, the camera unit and the identity unit can start their driving by the input of a predetermined key button.

The video data can be YUV data or RGB data

According to another embodiment of the present invention, an image signal processor can include a video data generating unit, generating video data corresponding to a video signal inputted from an image sensor; and an identity unit, detecting a location of a detected area formed by a predetermined light component from the video data in units of each frame, recognizing a moving locus of the detected area by comparing at least two continuous frames and generating and outputting corresponding change information. Here, the detected area can be formed by light, reflected by pointing-means and inputted, of light emitted to an outside by a light source.

The change information can be used as an input signal for function control and display control of the digital processing device including the image signal processor.

The identity unit can detect the size of the detected area, compare at least two continuous frames and generate and output change information corresponding to the size change of the detected area.

If the size of the detected area is changed by the pointing-means moved in a first direction, the change information can be recognized as a selecting command or an executing start command of an information item, corresponding to the moving locus, among a plurality of information items displayed on the display unit.

If the size of the detected area is changed by the pointing-means moved in a second direction reversely with respect to the first direction, the change information can be recognized as a selection releasing command of the selected information item.

If the first direction and the second direction are vertically with respect to the camera unit and the size of the detected area is changed at a rate identical to or larger than a predetermined rate, it can recognized that the size of the detected area is changed.

If the size of the detected area is increased and then decreased or is decreased and then increased at a rate identical to or larger than a predetermined rate, the change information can be recognized as a selection command of an information item located with a mouse cursor or a selection releasing command of a selected information item among a plurality of information items displayed on the display unit.

If the size of the detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

Also, the identity unit can detect the size of a first detected area and a second detected area in units of each frame corresponding to a plurality of pointing-means, respectively, compare at least two continuous frames and generate and output change information corresponding to the size changes of the first detected area and the second area.

If the size of the first detected area is increased and then decreased or is decreased and then increased at a rate identical to or larger than a predetermined rate, the change information can be recognized as a selection command of an information item located with a mouse cursor or a selection releasing command of a selected information item among a plurality of information items displayed on the display unit.

If the size of the second detected area is increased and then decreased or is decreased and then increased at a rate identical to or larger than a predetermined rate, the change information can be recognized as an option information displaying command of an information item located with a mouse cursor among a plurality of information items displayed on the display unit.

If the size of the first detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

The size of the detected area can be the area size of a figure formed by an outline of the detected area or the number of a pixel included in the detected area.

The light source emits light having a predetermined wavelength or luminance to an outside. The identity unit detects a location of the detected area from the video data by using the wavelength or the luminance.

According to another embodiment of the present invention, an application processor can include a receiving unit, receiving video data generated corresponding to an outside video signal from an image signal processor; an identity unit, detecting a location of a detected area formed by a predetermined light component from the video data in units of each frame, recognizing a moving locus of the detected area by comparing at least two continuous frames and generating and outputting corresponding change information. Here, the detected area can be formed by light, reflected by pointing-means and inputted, of light emitted to an outside by a light source.

The change information can be used as an input signal for function control and display control of the digital processing device including the image signal processor and the application processor.

The identity unit can detect the size of the detected area, compare at least two continuous frames and generate and output change information corresponding to the size change of the detected area.

If the size of the detected area is changed by the pointing-means moved in a first direction, the change information can be recognized as a selecting command or an executing start command of an information item, corresponding to the moving locus, among a plurality of information items displayed on the display unit.

If the size of the detected area is changed by the pointing-means moved in a second direction reversely with respect to the first direction, the change information can be recognized as a selection releasing command of the selected information item.

If the first direction and the second direction are vertically with respect to the camera unit and the size of the detected area is changed at a rate identical to or larger than a predetermined rate, it can be recognized that the size of the detected area is changed.

If the size of the detected area is increased and then decreased or is decreased and then increased at a rate identical to or larger than a predetermined rate, the change information can be recognized as a selection command of an information item located with a mouse cursor or a selection releasing command of a selected information item among a plurality of information items displayed on the display unit.

If the size of the detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

Also, the identity unit can detect the size of a first detected area and a second detected area in units of each frame corresponding to a plurality of pointing-means, respectively, compare at least two continuous frames and generate and output change information corresponding to the size changes of the first detected area and the second area.

If the size of the first detected area is increased and then decreased or is decreased and then increased at a rate identical to or larger than a predetermined rate, the change information can be recognized as a selection command of an information item located with a mouse cursor or a selection releasing command of a selected information item among a plurality of information items displayed on the display unit.

If the size of the second detected area is increased and then decreased or is decreased and then increased at a rate identical to or larger than a predetermined rate, the change information can be recognized as an option information displaying command of an information item located with a mouse cursor among a plurality of information items displayed on the display unit.

If the size of the first detected area is increased and then decreased or is decreased and then increased repeatedly twice or more at a rate identical to or larger than a predetermined rate, the change information can be recognized as an executing start command of an information item located with a mouse cursor among a plurality of information items displayed on the display unit.

The size of the detected area can be the area size of a figure formed by an outline of the detected area or the number of a pixel included in the detected area.

The light source emits light having a predetermined wavelength or luminance to an outside. The identity unit detects a location of the detected area from the video data by using the wavelength or the luminance.

According to another embodiment of the present invention, a digital processing device having a photographing function can include a camera unit, generating video data corresponding to an external video; and an identity unit, detecting the size of a detected area from the video data in units of each frame, recognizing the size change of the detected area by comparing at least two continuous frames and generating and outputting corresponding change information. Here, a moving width of a pointer, displayed on a display unit of the digital processing device, can be determined by the change information According to another embodiment of the present invention, a digital processing device having a photographing function can include a light source, emitting light to an outside; a camera unit, generating and outputting a video signal corresponding to an external video; a video data generating unit, generating video data corresponding to the video signal; and an identity unit, detecting a location and size of a detected area formed by light, reflected by pointing-means and inputted, of the light emitted from the video data in units of each frame, recognizing a moving locus and size change of the detected area by comparing at least two continuous frames and generating and outputting corresponding change information. Here, the pointer, the moving width of which is determined by the change information corresponding to the size change, can be displayed on a display unit of the digital processing device It can be predetermined that the moving width is increased or decreased by the increasing or the decreasing of the area.

If the size of the area is changed in a rate identical to or larger than a predetermined rate per unit time, it can be predetermined that the change information is recognized as a selecting command or a releasing command of an information item, located with the pointer, among a plurality of information items displayed on the display unit.

If the size of the area is changed in a rate identical to or larger than a predetermined rate per unit time and the increasing change and the decreasing change are repeated n time, n being a natural number, it can be predetermined that the change information is recognized as an executing start command or a releasing command of an information item, located with the pointer, among a plurality of information items displayed on the display unit.

The size of the detected area can be the area size of a figure formed by an outline of the detected area or the number of a pixel included in the detected area.

The light emitted from the light source can include at least one of a predetermined wavelength and luminance.

The identity unit can detect a location and size of the detected area from the video data by using at least one of the wavelength and the luminance.

The light emitted from the light source can be the polarized light.

The device can further include a filter allowing light having an identical phrase to the polarized light to penetrate through it. Here, the identity unit can detect the location and size of the detected area from the video data by using the light passing through the filter.

The device can further include a key input unit, having at least one key button. Here, the light source, the camera unit and the identity unit can start their driving by the input of a predetermined key button.

The light source, the camera unit and the identity unit periodically can start and stop their driving until the location of the detected area is detected.

The video data is YUV data or RGB data.

According to another embodiment of the present invention, a digital processing device can include an input unit, including at least one key button; a light source, emitting light to an outside; a camera unit, generating and outputting a video signal corresponding to an external video; a video data generating unit, generating video data corresponding to the video signal; and an identity unit, detecting a location of a detected area formed by light, reflected by pointing-means and inputted, of the light emitted from the video data in units of each frame, recognizing a moving locus of the detected area by comparing at least two continuous frames and generating and outputting corresponding change information. Here, the pointer, the moving width of which is determined by the input of a minute adjusting button, can be displayed on a display unit of the digital processing device.

The identity unit can generate and output corresponding change information by recognizing the size change of the detected area. Here, if the size of the area is changed in a rate identical to or larger than a predetermined rate per unit time, it can be predetermined that the change information is recognized as a selecting command or a releasing command of an information item, located with the pointer, among a plurality of information items displayed on the display unit.

The size of the detected area can be the area size of a figure formed by an outline of the detected area or the number of a pixel included in the detected area.

The input unit can further include a button for starting to drive the light unit, the camera unit and the identity unit The camera unit and the identity unit periodically can start and stop their driving until the location of the detected area is detected.

The video data can be YUV data or RGB data.

According to another embodiment of the present invention, an image signal processor can include a video data generating unit, generating video data corresponding to a video signal inputted from an image sensor; and an identity unit, detecting a location and size of a detected area formed by a predetermined light component from the video data in units of each frame, recognizing a moving locus and size change of the detected area by comparing at least two continuous frames and generating and outputting corresponding change information. Here, the detected area can be formed by light, reflected by pointing-means and inputted, of light emitted to an outside by a light source.

The change information can be used as an input signal for controlling the digital processing device including the image signal processor.

It can be predetermined that the moving width, displayed on a display unit of the digital processing device, is increased or decreased by the increasing or the decreasing of the area.

If the size of the area is changed in a rate identical to or larger than a predetermined rate per unit time, it can be predetermined that the change information is recognized as a selecting command or an releasing command of an information item, located with the pointer of the display unit, among a plurality of information items displayed on the display unit.

If the size of the area is changed in a rate identical to or larger than a predetermined rate per unit time and the increasing change and the decreasing change are repeated n time, n being a natural number, it can be predetermined that the change information is recognized as an executing start command or a releasing command of an information item, located with the pointer of the display unit, among a plurality of information items displayed on the display unit The light emitted from the light source can include at least one of a predetermined wavelength and luminance.

The identity unit can detect a location and size of the detected area from the video data by using at least one of the wavelength and the luminance The light emitted from the light source can be the polarized light The identity unit can detect the location and size of the detected area from the video data by using the polarized light. Here, the polarized light can be light passing through a filter allowing light having an identical phrase to the polarized light, included in the digital processing device including the image signal processor, to penetrate through it.

According to another embodiment of the present invention, an image signal processor can include a receiving unit, receiving video data generated corresponding to an outside video signal from an image signal processor; an identity unit, detecting a location and size of a detected area formed by a predetermined light component from the video data in units of each frame, recognizing a moving locus and size change of the detected area by comparing at least two continuous frames and generating and outputting corresponding change information. Here, the detected area can be formed by light, reflected by pointing-means and inputted, of light emitted to an outside by a light source.

The change information can be used as an input signal for controlling the digital processing device including the image signal processor and the application processor.

It can be predetermined that the moving width, displayed on a display unit of the digital processing device, is increased or decreased by the increasing or the decreasing of the area.

If the size of the area is changed in a rate identical to or larger than a predetermined rate per unit time, it is predetermined that the change information can be recognized as a selecting command or an releasing command of an information item, located with the pointer of the display unit, among a plurality of information items displayed on the display unit.

If the size of the area is changed in a rate identical to or larger than a predetermined rate per unit time and the increasing change and the decreasing change are repeated n time, n being a natural number, it can be predetermined that the change information is recognized as an executing start command or a releasing command of an information item, located with the pointer of the display unit, among a plurality of information items displayed on the display unit.

The light emitted from the light source can include at least one of a predetermined wavelength and luminance The identity unit can detect a location and size of the detected area from the video data by using at least one of the wavelength and the luminance.

The light emitted from the light source can be the polarized light.

The identity unit can detect the location and size of the detected area from the video data by using the polarized light. Here, the polarized light is light passing through a filter allowing light having an identical phrase to the polarized light, included in the digital processing device including the image signal processor, to penetrate through it.

To solve the above problems, another aspect of the present invention features a method for performing a non-contact function mode and a recorded medium having recorded a program for executing the method.

According to an embodiment of the present invention, a method for performing a non-contract function mode by a digital device having a photographing function can include a light source emitting light to an outside; a camera unit generating and outputting a video signal corresponding to an external video; a video data generating unit generating video data corresponding to the video signal; and an identity unit detecting a location and size of a detected area formed by light, reflected by pointing-means and inputted, of the light emitted from the video data in units of each frame, recognizing a moving locus and size change of the detected area by comparing at least two continuous frames and generating and outputting corresponding change information. Here, the pointer, the moving width of which is determined by the change information corresponding to the size change, can be displayed on a display unit of the digital processing device.

It can be predetermined that the moving width is increased or decreased by the increasing or the decreasing of the area.

If the size of the area is changed in a rate identical to or larger than a predetermined rate per unit time, it can be predetermined that the change information is recognized as a selecting command or a releasing command of an information item, located with the pointer, among a plurality of information items displayed on the display unit.

If the size of the area is changed in a rate identical to or larger than a predetermined rate per unit time and the increasing change and the decreasing change are repeated n time, n being a natural number, it can be predetermined that the change information is recognized as an executing start command or a releasing command of an information item, located with the pointer, among a plurality of information items displayed on the display unit.

The size of the detected area can be the area size of a figure formed by an outline of the detected area or the number of a pixel included in the detected area.

The light emitted from the light source can include at least one of a predetermined wavelength and luminance.

The identity unit can detect a location and size of the detected area from the video data by using at least one of the wavelength and the luminance.

The light emitted from the light source can be the polarized light.

The digital processing device further can include a filter allowing light having an identical phrase to the polarized light to penetrate through it. Here, the identity unit can detect the location and size of the detected area from the video data by using the light passing through the filter.

The digital processing device can further include a key input unit, having at least one key button. Here, the light source, the camera unit and the identity unit can start their driving by the input of a predetermined key button.

The light source, the camera unit and the identity unit periodically start and stop their driving until the location of the detected area is detected.

The video data can be YUV data or RGB data.

BRIEF DESCRIPTION OF THE DRAWINGS

FIG. 10 is an example illustrating a table of an image mapping program realizing an image mapping method of FIG. 9;

DETAILED DESCRIPTION

Figure 1:
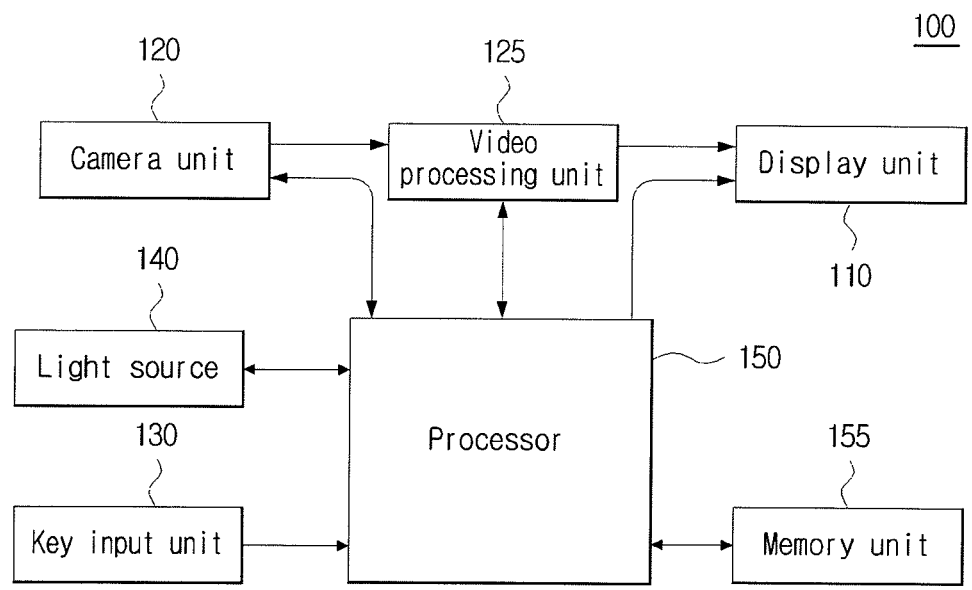
FIG. 1 is a block diagram illustrating a mobile communication terminal in accordance to an embodiment of the present invention.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

The present invention can be applied to the case that a portable terminal, such as a portable phone and a PDA, is equipped with a camera, but not necessarily limited thereto. Any person of ordinary skill in the art must understand that an image tilt correction method in accordance with an embodiment of the present invention can be applied to even a camera device.

Of course, the inventive spirit suggested by the present invention can be applied to all digital devices having camera functions without any restriction. For example, the present invention can be used for a digital home appliance, such as a TV, a refrigerator, a digital camera and a computer, and a variety of digital communication devices. The blow description is based on a mobile communication terminal, a digital camera or a portable multimedia device, which is one of the representative digital devices, and is referred to as a "digital processing device." However, since the present invention can be applied to an universal digital processing device, for the convenience of description, the terms designating the digital processing device can be described by being replaced with a terms designating a particular electronic device Also, this description discloses the invention that can adjust a moving width of a pointer for recognizing the size change of detected area on each frame photographed through a camera unit. In case that the detecting object is similar to a circle (e.g. an end part of a finger), the detecting object can be recognized by analyzing an area formed by being inputted with the light, emitted from an edge direction or an additional light source, that has been reflected by the pertinent object. A location change of the detected area (or a center point) can be used in order to recognize the location change of a position pointed by the pointer, and the size change of the detected area on each frame can be used in order to adjust a moving width of the pointer.

Related to this, the description is based on the method for controlling the moving width of the pointer by analyzing an area formed by being inputted with the light, emitted from an additional light source, that has been reflected by the pertinent object. However, any person of ordinary skill in the art can easily understand that the present invention is not limited to this method, and can be applied to all methods capable of being recognized by a method predetermined with a detected area from each frame.

FIG. 1 is a block diagram illustrating a mobile communication terminal in accordance to an embodiment of the present invention.

Here, each block of FIG. 1 can be merely the block illustrated by separating a performing operation of a digital processing device 100 per each function for the convenience of description. Accordingly, at least 2 blocks can be integrated and realized as one chip. As necessary, it shall be also obvious that it can be embodied by being separated into more blocks.

Referring to FIG. 1, the digital processing device 100 includes a display unit 110, a camera unit 120, a video processing unit 125, a key input unit 130, a light source 140, a processor 150 and a memory unit 155. In case that the illustrated digital processing device 100 is a mobile communication terminal, it shall be obvious that the digital processing device 100 can further include a wireless communication unit, performing a wireless function, and a transmitting and receiving unit, inputting and outputting voice data, which are not shown. Also, the camera unit 120 and the video processing unit 125 can be referred to as the camera unit 120 for the convenience.

The key input 130 provides a user interface, for inputting data (e.g. character data and/or numerical data) or selecting a menu function. However, since the present invention supports selecting a non-contact function, some or all of a plurality of key buttons provided on the conventional digital processing device can be omitted.

The key input unit 130 will be hereinafter described with reference to FIG. 2 in detail. In accordance with the present invention, a key button and/or menu item, for performing a non-contact function mode (i.e. for inputting a control command by using a moving locus of light or an area formed by light, the light having been emitted from the light source 140 and being reflected by a photographic subject (e.g. an end part of a finger) and inputted into the camera unit 120), can be pre-designated. A user can allow the digital processing device 100 to be under a non-contact function mode by selecting the pertinent key button and/or menu item. If the digital processing device 100 is under the non-contact function mode, for example, the light source unit 140, the camera unit 120 and the video processing unit 125 can be controlled to function corresponding to the non-contact function mode.

The camera unit 120 can include a lens unit, an image sensor unit and a signal processing unit. The lens unit (not shown) gathers the light reflected by the photographic subject, and the image sensor unit (not shown) converts a gathered optical video signal into an electrical video signal (e.g.

an analog video signal) and outputs the converted video signal. The signal processing unit (not shown) converts the electrical video signal, inputted from the image sensor unit, a digital video signal and outputs the converted video signal. Also, in case that the light emitted from the light source is polarized light, the camera unit 120 can further include a filter (not shown) for allowing an external video having the same phrase as the polarized light only to penetrate through the camera unit 120. In this case, the filtering of the external video can be performed before the image sensor unit converts the external video into the electrical signal or can be performed in a form of extracting a particular component from the converted video signal.

Here, a charge coupled device (CCD) sensor or a complementary metal-oxide semiconductor (CMOS) sensor can be used for the image sensor unit, and the signal processing unit can employ a digital signal processor (DSP).

The video processing unit 125 performs various processing operations of the video data, inputted from the camera unit 120, or video data, stored in a below-described memory unit 155. For example, the video processing unit 125 can performs the video processing, such as the compression and recovering of the video data, the adjustment of size or brightness (luminance) of the video data, the interpolation between pixels of the video data, the gamma correction or chrominance correction of the video data and the format conversion converting RGB video data into YUV video data. The video processing unit 125 can be integrated with the aforementioned signal processing unit and can be included as an element of the camera unit 120.

The video processing unit 125 can further include an identity unit (not shown) for identifying the moving locus or size change of an area (hereinafter, referred to as a 'detected area') formed by the light, which has been emitted from the light source 140, reflected by pointing-means (e.g. a finger located at regular intervals before the lens unit) by using the RGB data and the YUV data.

As described below with reference to FIG. 15, the detected area can be partitioned into a plurality of sections such as a first detected area and a second detected area. At this time, the first detected area and the second detected area can be partitioned for different usages, respectively, and can identify each change of detected areas. For example, in order to function as a mouse, the change of the first detected area can be recognized as the manipulation of a left button of the mouse, and the change of the second detected area can be recognized as the manipulation of a right button of the mouse. In case that the identity unit is included in the processor 150, the change of the detected area can be identified by the processor 150.

In case that the change of the detected area is identified by the processor 150, it shall be obvious that the identity unit can be included in the processor 150. The detected area can be recognized by detecting the wavelength component of the light, emitted from the light source 140, from video data of each frame processed by the video processing unit 140. For this, the wavelength of the light, emitted from the light source 140, must be predetermined according to the type of the equipped light source. The wavelength band for detecting can be predetermined. Also, in case that the light emitted from the light source 140 is polarized light, the detected area can be more clearly recognized by firstly filtering an external video, having a different phrase from polarized light, from external videos and by relatively increasing the magnitude of the wavelength, identical to the light emitted from the light source 140, of the external video. For example, in case that the light emitted from the light source 140 is infrared light, the external video can be filtered by a filter for allowing the only infrared light to penetrate through it.

The identifying operation of the change of the detected area can be performed in the operation that the digital processing device 100 functions as a preview mode. The preview mode refers to the executing mode displaying a video signal, inputted in real-time through the camera unit 120 as visual information. A user can check the visual information displayed on the display unit 110 in the preview mode. Then, the user can generate encoded image data corresponding to the external video by selecting a predetermined button (e.g. a shutter button) and write the generated image data in a memory unit 155 (i.e. execute a capture mode). The reason that the identifying operation of the change of the detected area is performed in the preview mode is that video information related to not only a current frame but also earlier frames, which are a comparison object, is requested in order to identify the moving locus of the detected area or the size change of the formed area. For this, the video processing unit 125 can include a memory for storing video information related to each frame (or analysis information analyzing the properties (e.g. location and size) of the detected area in the pertinent frame).

The video processing unit 125 can be divided into an image signal processor and a back end chip (or application processor). The image signal processor converts a video signal, inputted from the camera unit 120, into YUV data and outputs the converted YUV data to the backend chip. The backend chip can converts the inputted YUV data into JPEG or BMP data by a predetermined encoding method, to store the converted data in the memory unit 155 or decode the image data in the memory unit 155 to display it on the display unit 110. Of course, the function generating image data by a predetermined encoding method can be performed by the image signal processor. The aforementioned identity unit can be included in the image signal processor or the backend chip.

The light source 140 emits light having a particular wavelength by a particular control signal (e.g. a control signal for starting a non-contact function mode) of the processor 150. The wavelength of the light, emitted from the light source 140, can be predetermined. Through this, the detected area can be easily recognized by using a filter allowing a light component, corresponding to the pertinent wavelength, to penetrate through it. Also, the light emitted from the light source 140 can be light polarized by a particular wavelength and/or a particular phrase. Through this, the detected area can be easily recognized by using a filter allowing only light component having a direction identical to the polarized phrase to penetrate through it. The light emitted from the light source 140 is preferably determined as light having no harmful properties for a human being.

The light emitted from the light source 140 can be inputted into the camera unit 120 by being reflected by pointing-means (e.g. user's finger), which is the photographic subject. For this, a light emitting angle of the light source 140 can predetermined as the angle, the light emitted at which is reflected by the pointing-means such that the light can be inputted through the lens unit of the camera unit. Alternatively, the light emitting angle of the light source 140 can be realized such that a user can adjust the angle by using the key input unit 130, for example. It shall be obvious that the light source 140 can employ various emitting device (e.g. light emitting diode (LED)) according to a realizing method without any restriction. For example, the light source 140 can be an infrared LED. Also, in case that the identity unit detects a location of the detected area from the video data by using polarized light, it is obvious that it is requested to additionally be equipped with means for polarizing the light, emitted from the light source 140, that is, the emitting device in a particular direction. The light source 140 can stop emitting light by a particular control signal (e.g. a control signal for stopping the non-contact function mode) of the processor 150.

The display unit 110 displays various data including an operating state of the digital processing device 100, character data (or numerical data) inputted through the key input unit 130 and video data stored in the below-described memory unit 155. For example, in case that a user selects the non-contact function mode, the display unit 110 can display a menu icon, corresponding to various kinds of menu functions equipped in the digital processing device 100, and/or a mouse cursor for the movement to the menu icon. The display unit can be realized as a liquid crystal display (LCD) or an organic light emitting diode (OLED), for example. The display unit 110 can further include an additional display memory temporally storing various data to be displayed.

The aforementioned light source 140 and display unit 120 will be below described with reference to FIG. 2 in more detail.

The memory unit 155 can store various kinds of input data including video data, various programs requested for the general operation or functional driving of the digital processing device 100. Particularly, the memory unit 155 in accordance with the present invention can store an image mapping program for analyzing a function non-contactly selected by a user. The memory unit 155 can be embodied as an integrated memory or by being separated into a plurality of memory units (e.g. a program memory, a data memory and a video memory).

The processor 150 controls a general operation of the digital processing device 100. For example, the processor 150 can control to receive various kinds of data, such as input data, inputted the key input unit 130, and video data, stored in the memory unit 155 and to display the data through display unit 110.

The processor 150 can also control the photographing of the camera unit 120, the video processing of the video processing unit 125 and the operating of the light source 140. For example, in the case of being inputted with a key button for selecting the start/stop of the non-contact function mode, the processor 150 can control the operations of the camera unit 120, the video processing unit 125 and the light source 140, corresponding to the performance or completion of the non-contact function mode.

Beside that, the processor 150 can realize a non-contact mouse function by detecting an area (hereinafter, is called 'a detected area') photographed by pointing-means in the video data inputted from the camera unit 120 and by recognizing the location change of the detected area according to the input order of the video data. The realization of the non-contract mouse function will concretized through the description related to the below drawings.

In addition, the processor 150 can periodically (e.g. every 0.1 second) control the camera unit 120, the video processing unit 125 and the light source 140 to be driven, to check whether to perform the non-contact function mode and if valid movement (e.g. horizontally movement or vertically movement) is detected through, for example, the camera unit 120, can control to perform the contact function mode sustainedly after that. Conversely, if no valid movement is detected, the processor 150 controls to perform a sleep mode (or a standby mode). If the non-contact function mode starts to be operated, it can be checked every predetermined checking period (e.g. every 10 second) whether the valid movement is inputted to determine whether to maintain the operation of the pertinent mode. If no valid movement is inputted, the processor 150 can control to stop the non-contact function mode. Of course, it shall be obvious that the automatically started operation of the non-contact function mode can be stopped by inputting a predetermined key button.

In case that a user inputs a command (e.g. a minute moving command of a pointer) controlling a moving width of a pointer that moves on display unit 110 through predetermined input means (e.g. a key button or a side key 132), the processor 150 can control the moving width of the pointer regardless of a distance spaced with pointing-means.

Also, as described above, in case that the identity unit is included in the processor 150, the processor 150 can recognize the change of the detected area by using successive video data processed by the video processing unit and control the operation of a corresponding element to perform a control operation (e.g. an operation moving the location of the pointer displayed on the display unit 110 for menu selection) corresponding to a user control command inputted by the non-contact function mode. For example, the processor 150 runs an image mapping program stored in the memory. Then, the processor 150 can recognize a menu function corresponding to a location (i.e. a location of a detected area) non-contactly selected by a user by using the run image mapping program.

Beside that, the processor 150 can recognize the size of the detected area by using the successive video data processed by the video processing unit 125 and identify a distance (i.e. a distance spaced between the pointing-means and the camera unit, and hereinafter, is called 'spaced distance') formed with the detected area. In this case, the moving width of the pointer moving on the display unit 110 can be variously adjusted according to the identity distance. For example, in case that the spaced distance is decreased (i.e. the size of the detected area is increased), the moving width of the pointer can be controlled to be increased. Conversely, in case that the spaced distance is increased (i.e. the size of the detected area is decreased), the minute adjustment can be performed by controlling to decrease the moving width of the pointer. Of course, the rate increasing or decreasing the size of the detected area can be predetermined to select/release information item located with the pointer or to identify it from an executing command. The rate can be also adjusted differently according to the user. This will be described below in detail.

Of course, as described above, recognition information related to the change of the detected area (e.g. information related to the change of a moving locus or a size of the formed area) can recognized by the video processing unit 125, and thus, a corresponding control signal can be inputted into the processor 150.

The method for recognizing the non-contactly selected function by the processor 150 or the video processing unit 125 by using the image mapping program will be hereinafter described in detail with reference to FIG. 9 through FIG. 11.

Figure 2:
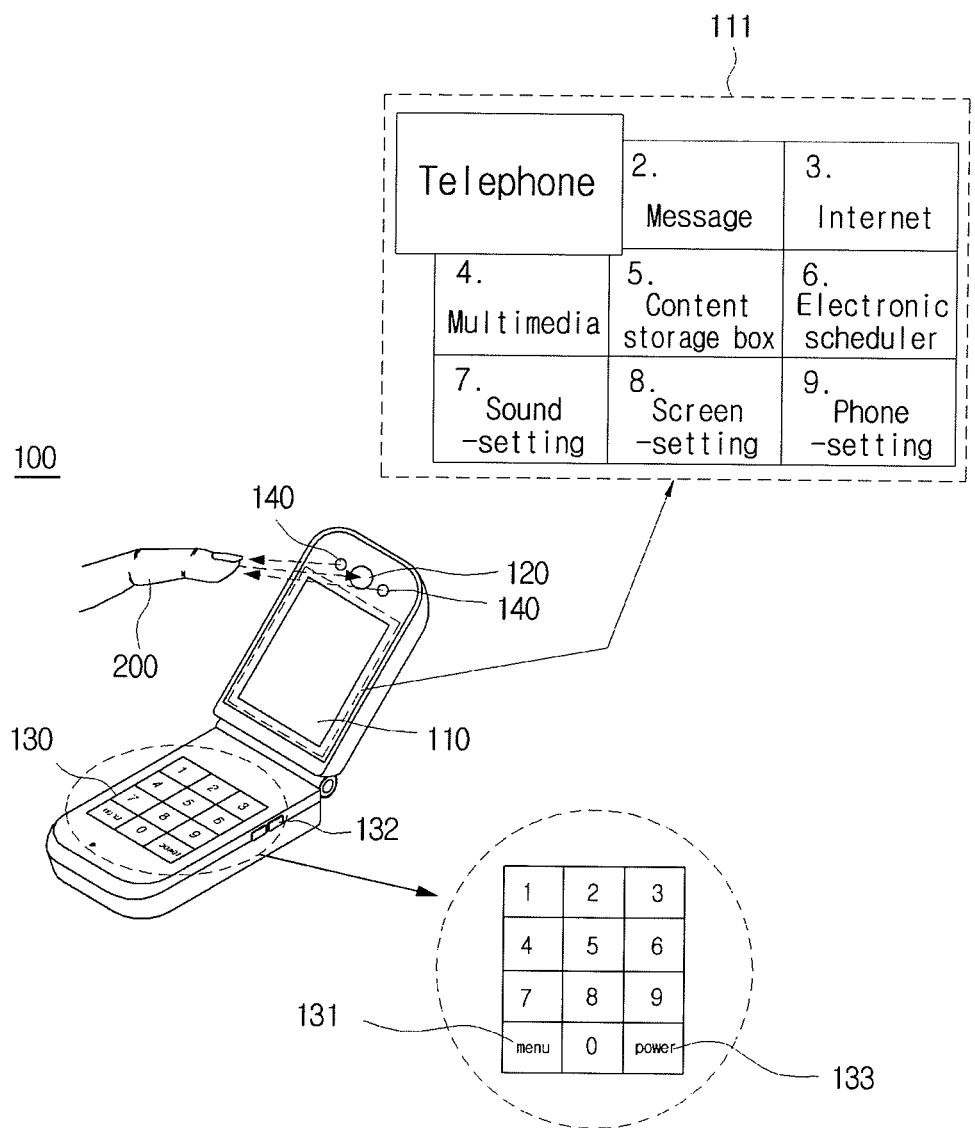
FIG. 2 illustrates an external appearance of a mobile communication terminal and a using state of a non-contact function mode in accordance to an embodiment of the present invention.

FIG. 2 illustrates an external appearance of a mobile communication terminal and a using state of a non-contact function mode in accordance to an embodiment of the present invention.

Although FIG. 2 illustrates a folder type mobile communication terminal as the digital processing device 100, it shall be obviously that the digital processing device 100 can be various types (e.g. a flip type and a slide type) of the mobile communication terminal.

Also, even though FIG. 2 illustrates that the camera unit 120 (i.e. the lens unit exposed to an outside) is equipped with the light sources 140, respectively, in each opposite part, one by one, the number of the mountable light sources is not limited. For example, four light sources 140 can be mounted in four sides, respectively, based on the camera unit 120. Alternatively, three light sources 140 can be provided in angular points, respectively, of a regular triangle, the middle point of which the camera unit 120 is located at.

Beside that, the light source 140 can be omitted in a specific case. For example, in case that it can be possible to input a control command in the non-contact function mode in accordance with the present invention by using pointing-means (e.g. pointing-means realized as a stylus pen) including a light-emitting unit capable of emitting light having a specific wavelength and/or luminance (hereinafter, referred to as a 'wavelength') to an end part, the light source 140 can be omitted. This is because the change of the detected area can be identified by analyzing a location and/or range of a pixel, corresponding to the wavelength of light emitted from the light-emitting unit equipped in the pointing-means, in the video data of each frame inputted through the camera unit 120 and processed by the video processing unit 125. However, the below description is based on the case that the light source 140 is provided in the digital processing device 100.

Here, the location equipped with the camera unit 120 can be different from that illustrated by FIG. 2. Of course, the camera unit 120 can be mixably used for general video photographing as well as the performance of the non-contact function mode in accordance with the present invention. In this case, it can be necessary to identify whether the operation of the camera unit 120 or the video processing unit 125 aims to execute the non-contact function mode or to photograph a typical video. This is to restrict to the losing of the unnecessary power and to the decreasing of the processing efficiency by performing an only operation for recognizing the change of the detected area without necessary to perform all processes for which the video processing unit 125 displays a preview video on the display unit 110. For this, the processor 150 can provide a control signal corresponding to how to use a video signal currently inputted into the camera unit 120 and/or the video processing unit 125. For example, in case that a user directs to execute the non-contact function mode, the non-contact function mode can be executed instead of the typical video photographing by transferring to a particular control signal corresponding to the non-contact function mode to the camera unit 120 and/or the processing unit 125. Similarly, in case that the user directs the general video photographing function, the losing of the unnecessary power and the decreasing of the processing efficiency can be restricted because all processing operations for analyzing the detected area and recognizing its change is not performed by transferring to a particular control signal corresponding to the photographing of the typical video to the camera unit 120 and/or the processing unit 125. However, the below description is based on the functions of the camera unit 120 and/or the processing unit 125 when the non-contact function mode is performed.

Referring to FIG. 2, the digital processing device 100 in accordance with an embodiment of the present invention includes the display unit 110, the camera unit 120, the key input unit 130 and the light source unit 140.

The light source 140 can emit light, having a particular wavelength or a particular wavelength and simultaneously polarization of a particular phrase, to an outside. The light emitted from the light source 140 is reflected by pointing-means 200 (e.g. an end part of a user's finger), and the reflected light is inputted through the lens unit of the camera unit 120. Accordingly, as described above, a light emitting angle of the light source 140 is preferably predetermined as the angle, the light emitted at which is reflected by the pointing-means 200, regularly spaced away from the digital processing device 100, such that the light can be inputted through the camera unit 120.

Here, the light source 140 can be controlled to be operated only if there is a direction by the processor 150. For example, in case that a user directs to execute the non-contact function mode by selecting a predetermined button of key buttons mounted on the key input unit 130 (i.e. pressing a 'menu button 131' or a 'side key 132' during a predetermined period of time) or selecting a predetermined menu item, the processor 150 can control the light source 140 to be turned on. Also, in case that the user directs to stop the non-contact function mode by a similar method, the processor 150 can control the light source 140 to be turned off. This makes it possible to prevent unnecessary power loss of a battery that can be generated by emitting light all the time because the light source 140 has always been turned on. Also, as described above, the processor unit 150 can periodically (e.g. every 0.1 second) the camera unit 120, the video processing unit 125 and the light source 140 to be driven.

Beside that, the processor 150 will be able to control the photographing function of the camera unit 120 by the same method. In other words, in the case of executing a typical photographing function (i.e. a preview mode or a capture mode), the processor 150 can control the analyzing of the detected area and the recognizing of its change, by the video processing unit 125 or the identity unit, not to be performed.

Of course, in case that the digital processing device 100 in accordance with the present invention is equipped with an additional moving recognizing sensor (e.g. a motion sensor), the digital processing device 100 can use the moving recognizing sensor to select the non-contact function mode. In other words, if a user takes a particular action (e.g. waves a hand twice within 1 second), the moving recognizing sensor senses the action and transfers a sensing signal to the processor 150, At this time, the processor 150 can control the operations of the light source 140, the camera unit 120 and/or the video processing unit 125 by determining that the user selects the non-contact function mode through the transferred sensing signal.

However, the below description assumes that it is determined through the menu button of the key input unit 130 whether to select the non-contact function mode and that the light source 140 and the camera unit 120 are controlled to be operated in the only case of selecting the non-contract function mode. The identity unit, included in the video processing unit 125 or the processor 150, performing to analyze the detected area and to recognize its change will be controlled to be operated in the only case of executing the non-contact function mode. The below description assumes that the identity unit is included in the video processing unit 125.

The camera unit 120 generates in real-time and outputs a video signal corresponding to an external video. The video signal is inputted into the video processing unit 125 and converted into video data in a format for generating recognition information related to the change of the detected area (e.g. information related to a moving locus or the size change of a formed area). The converted video data in the format can be any one of YUV data and RGB data, for example. The identity unit recognizes the detected area by using the converted video data and generates recognition information related to the change (e.g. the information related to the moving locus or the size change of the formed area) by recognizing the difference between a current frame and an earlier frame, to input it into the processor 150. The aforementioned detected area can be recognized by using the video data inputted in real-time as a preview mode type or by using continuously photographed video data (a capture mode type). However, in the case of the latter, its processing speed can be slow because photographed video data (e.g. video data encoded according to a predetermined compressing standard such as JPEG and MPEG) corresponding to an outside video is generated.

The key input 130 provides a user interface, for inputting character data and/or numerical data. Also, as described above, a user can set the start/stop of the non-contact function mode by a predetermined key button of the key input unit 130. For example, the key buttons, for selecting the start/stop of the non-contact function mode, can be predetermined differently from each other. Of course, the key buttons, for selecting the start/stop of the non-contact function mode, can be designated as the same key button and be alternately used so as to select the start or release according to the number of the same key button to be pressed. Alternatively, it can be predetermined that the non-contact function mode is performed only while a pre-designated button is pressed. Also, as described above, it can be determined by the control of the processor 150 instead of the pressing of the pre-designated key button whether to start/release the non-contact function mode.

Beside that, although the present invention suggests the method that the moving width of the pointer is automatically controlled by using the size of the detected area according to the spaced distance, the user will be able to control the moving width of the pointer moving on the display unit 110 by using a pre-designated key button or the side key 132 of the key input unit 130. For example, it can be predetermined that the pointer can make a minute movement regardless of a distance formed with the detected area, only while a predetermined button is pressed.

Since the digital processing device 100 in accordance with the present invention can select an information item (e.g. each information item, such as telephone and screen setting, illustrated in FIG. 2) by using the non-contact function mode in order to direct to start the execution, as illustrated in FIG. 2, various kinds of functional buttons (e.g. a telephone call button and an Internet access button), for selecting the information item, and/or a direction key button, for moving the information item, can be omitted in the key pad.

Of course, some functional buttons, necessary for providing the convenience to a user or performing a function (e.g. a power turn-on function of the digital processing device), which is unable to be recognized through the non-contact function mode in accordance with the present invention, can be included in the key pad. In other words, it shall be obvious that the structure and type of the key input unit 130 in accordance with the present invention, which must be determined by versatilely considering the requirement of a user, the convenience of function selecting, and the efficiency of the design of the digital processing device, can be varied in addition to the type illustrated in FIG. 2. This is why the type having some functional buttons (e.g. the menu button 131 and the power button 133) as well as buttons for inputting character and numerical data is illustrated in the case of the key input unit 130 of FIG. 2.

As described above, the digital processing device 100 capable of executing the non-contact function mode in accordance with the present invention can minimize the digital processing device and makes it possible to vary its design because the digital processing device 100 can remove the space as much as that occupied by the functional button, for example, or use the space for another usage. Of course, it shall be obvious that various functional buttons, which can be omitted, can be included in the key pad, for the convenience of the user.

In case that a user directs to execute the non-contact function mode, the display unit 110 of the present invention can display the information items on the whole part or some part (hereinafter, referred to as an 'information item display section 111' of a screen. For example, in case that the user directs to perform the non-contact function mode by selecting a predetermined button or menu item of the key input unit 130, an initial screen, displayed through the display unit 110, can be converted into a screen including the information item display section 111, illustrated in FIG. 2. Of course, it is obvious that the screen, itself, including the information item display section 111 can be used as the initial screen, or the method for forming the initial screen can be variously applied. The below description assumes that the information item display section 111 is displayed on the whole part of the display unit 110 in case that the non-contact function mode is performed.

Beside that, although the information item display section 111 can be displayed with all information items designated to individually execute all functions, the below description assumes the case of being partitioned into 9 partitioned sections and displayed as illustrated in FIG. 2. Like this, in case that the information item display section 111 is partitioned into 9 partitioned sections as illustrated in FIG. 2, and the information items corresponding to each function are displayed, the user can select more favorite 9 functions from all kinds of functions mounted on the digital processing device and allow the 9 functions to be displayed.

Accordingly, in the digital processing device 100, capable of executing the non-contact function mode, in accordance with the present invention, the information item display section 111, displayed on the display unit 110, can be displayed with a predetermined information item or an information selected by the user. For example, the selection of the information items can be possible by being mounted with a button for changing the information items through a space, occupied by the key input unit 130, or an additional space, or by allowing the already-mounted key button to be used for a pertinent usage.

Figure 3:
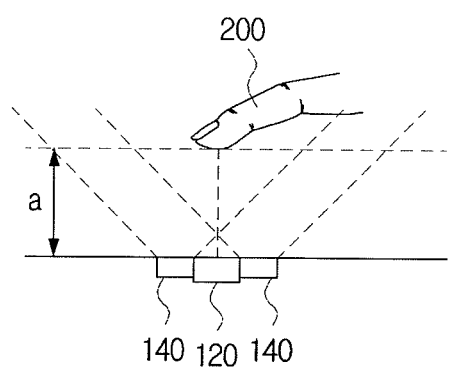
FIG. 3 through FIG. 5 are examples illustrating an operating principle of a non-contact function mode in accordance to the present invention.
Figure 4:
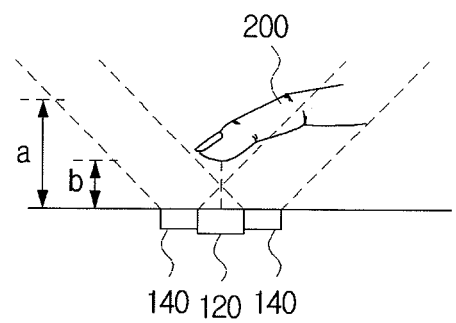
Figure 5:
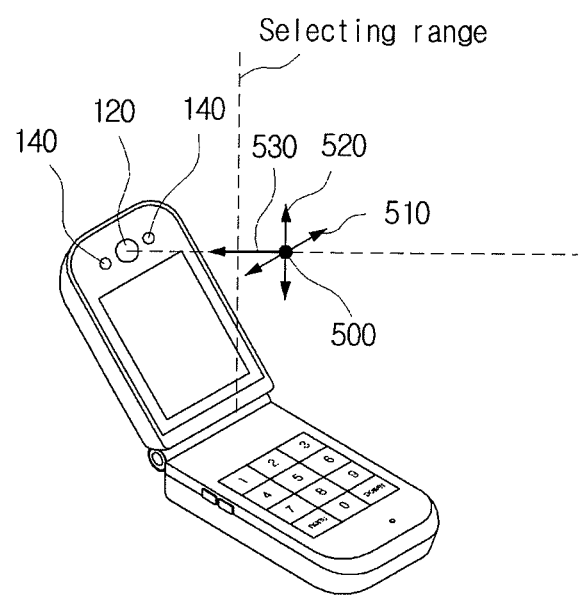

FIG. 3 through FIG. 5 are examples illustrating an operating principle of a non-contact function mode in accordance to the present invention. FIG. 3 through FIG. 5 illustrate the operation that a user executes a non-contact function in accordance with the present invention by using pointing-means 200 after the execution of the non-contract function mode is started by the user.

Here, an object capable of being used as the pointing-means is not limited, and any object that can reflect light emitted from the light source 140 and input the reflected light to the camera unit 120 is sufficient. However, the below description assumes that the pointing-means is a user's finger. For the convenience of description, the FIG. 3 and FIG. 4 separately illustrate the camera unit 120 of devices capable of selecting the non-contact function in accordance with the present invention.

The user directs to execute the non-contract function mode. Then, a user's finger is located in front of and separately from the camera unit 120. In this case, the light, having a specific wavelength or a specific wavelength and simultaneously polarization in a specific direction, emitted from the light source 140 is reflected by the user's finger and inputted into the camera unit 120. The optical video information, inputted into the camera unit 120 is converted into a video signal and inputted into the video processing unit 125. The video processing unit 125 converts the inputted video signal into video data for analyzing the detected area and/or recognizing its change. The converted video data can be any one of YUV data and RGB data, for example. A view angle of the camera unit 120 and a light-emitting angle of the light source 140 can be predetermined. For example, the angle of the camera unit 120 and the light-emitting angle of the light source 140, respectively, are set as 120 degree. The angle and/or the light-emitting angle can be variously changed.

At this time, the light, reflected by the finger, of the light, having the specific wavelength or the specific wavelength and simultaneously polarization in the specific direction, emitted from the light source 140, forms as a video on the lens unit. An area formed by the reflected light will include information, separated from another part of an input video (e.g. different wavelength or luminance). Change information (e.g. a moving locus and/or the size of a formed area) of the detected area between successive frames can be recognized by recognizing the detected area formed by the light reflected from the video data of each frame. Accordingly, the detected area will be formed corresponding to the moving locus and/or the moving direction of the finger.

For example, the identity unit can determine the detected area and recognize the change information of the detected area between each frame by performing a filtering operation allowing an only area of a specific wavelength to be detected. Alternatively, the identity unit can determine the detected area and recognize the change information of the detected area between each frame by detecting an area having a specific luminance component from the video data of each frame. Also, the identity unit will be able to determine the detected area and recognize the change information of the detected area between each frame by filtering the light polarized in a specific direction or a specific component (e.g. wavelength or luminance) of the video information and then by detecting an area having a specific wavelength or a specific luminance component. The valid range of the wavelength or luminance for determining the detected area can be predetermined, and the detected area can be determined by recognizing a location of pixels corresponding to a wavelength component or a luminance component within a pertinent range.

Here, the moving locus of the detected area can be recognized by using, for example, information related to how the center point of the detected area, formed by the reflected light, is changed in each frame.

The size of the formed area of the detected area can be recognized by using, for example, the area size of a figure formed by an outline of the detected area in the video data of each frame or the number of pixels included in the detected area.

In case that the formed area size of the aforementioned detected area is different between frames, the different detected area between can be recognized as press/release. For example, while any one menu item (e.g. 'telephone' of FIG. 2) is increased and displayed on display unit 110, or a pointer points to any one menu item, if the size of the detected area is increased (i.e. a finger moves toward the lens unit) within a predetermined period of time, it can be recognized that the pertinent menu item is selected (pressed). Alternatively, while any one menu item (e.g. 'telephone' of FIG. 2) is increased and displayed on display unit 110, or a pointer points to any one menu item, if the size of the detected area is decreased (i.e. a finger moves reversely toward the lens unit) within a predetermined period of time, it can be recognized that the pertinent menu item is released.

The increase or decrease of the formed area size of the detected area can be determined by comparing the formed area size calculated by per each frame unit between continuous frames. However, in the only case of increasing or decreasing the size of the detected area at a rate identical to or larger than a predetermined rate, it can be recognized that the size change of the detected area must be recognized as press/release. Here, in the case of changing the size of the detected area at a rate smaller than a predetermined rate, the size change will be used only for pointing-means to recognize the change of a spaced distance. In this case, the recognized distance will be used to adjust a moving width of a pointer corresponding to the distance.

As compared with FIG. 3, in the case of FIG. 4, the user's finger is located closer to lens unit of the camera unit 120. If it is assumed that the user's finger moves from the location of FIG. 3 to the location of FIG. 4, the detected area formed by the light reflected by the user's finger is increasing in size. In this case, the identity unit generates corresponding recognition information and inputs the generated recognition information into the processor 150, and the processor 150 determines whether the size of the detected area is changed at a rate identical to or larger than a predetermined rate (e.g. the changed number of pixels included in the detected area within a predetermined time). If it is determined that the size of the detected area is changed at a rate identical to or larger than a predetermined rate, it can be recognized as a command selecting the information item located with the pointer. However, if the size of the detected area is changed at a rate smaller than a predetermined rate, it can be recognized as an only command decreasing the moving width of the pointer corresponding to an area formed with the detected area. Also, it shall be obvious that the selecting command and the moving width decreasing command are separated from each other, these commands can be mutual-overlappedly applied.

Then, the processor 150, which has recognized that the detected area formed by the light reflected by the user's finger is increasing, can recognize a pertinent information item (e.g. a menu icon) and drive a function (or application) corresponding to a pertinent menu item. However, if the non-contact function mode is used while the user's finger is regularly spaced away from the lens unit, since the location of the finger can be upwardly or downwardly changed within a regular distance without intention, the standard (i.e. selecting range) for recognizing the change as pressing can be predetermined. Here, the selecting range can be predetermined as a distance before the camera unit 120 by its manufacturer. Through this, the user can select or execute a corresponding menu item by taking an action such as pretending to press an imaginary key button provided above the lens unit of the camera unit 120. At this time, the processor 150 can determine whether the user selects a non-contact function through the comparison of the area formed in each video frame according to a location of the finger. In other words, in case that the size of the area, formed by the movement of the finger, in the inputted video is increasing according the successive order of each video frame, the processor 150 will be able to consider that the user intends to select a menu item and icon.

Reversely, if it is assumed that the user's finger moves from the location of FIG. 4 to the location of FIG. 3, the detected area formed by the light reflected by the user's finger is decreasing in each frame. In this case, the identity unit generates corresponding recognition information and the generated recognition information to the processor 150, and the processor 150 determines whether the size of the detected area is changed at a rate identical to or larger than a predetermined rate. If it is determined that the size of the detected area is changed at a rate identical to or larger than a predetermined rate, the processor 150 can recognize the size change as a selection releasing command of an information item located with the pointer. However, if the size of the detected area is changed at a rate smaller than a predetermined rate, the size change will be recognized as an only command increasing the moving width of the pointer corresponding to an area formed with the detected area Also, in case that the formed area size of the detected area is repeatedly increased and decreased at a rate identical to or larger than a predetermined rate (e.g. in case that pointing-means continuously changes a distance spaced away from the camera unit n times, n being a natural number), the processor 150 can consider the repeated size change as an executing start command or a releasing command of a selected information item and drive a function (or application) corresponding to a pertinent information item. However, if the non-contact function mode is used while the user's finger is regularly spaced away from the lens unit, since the location of the finger can be upwardly or downwardly changed within a regular distance without intention, the standard (i.e. selecting range) for recognizing the change as a selecting command, a selection releasing command or an executing start command can be predetermined.

Here, the selecting range can be predetermined as a distance before the camera unit 120 by its manufacturer. Through this, the user can select, release or execute the information item located with the pointer by taking an action such as pretending to press an imaginary key button provided in an upper part of the lens unit of the camera unit 120.

The principle for selecting the non-contact function in accordance with the present invention will become more apparent through the below description related to FIG. 5.

Referring to FIG. 5, the point corresponding to a reference number 500 refers to an end part of the user's finger for the convenience of description. Also, arrows corresponding to a reference number 510 and another reference number 520 indicate horizontal movement of the end part of the finger by the user. Another arrow corresponding to a reference number 530 indicates vertical movement of the end part of the finger. Of course, although the end part of the finger can be rotationally (clockwise or anticlockwise) moved, the pertinent description will be omitted.

Here, the horizontal movement (including rotational movement) indicates all moving locus of the end part of the user's finger moved in a regular (or within error range) vertical distance from a plane equipped with the lens unit of the camera unit 120. Accordingly, although FIG. 5 illustrates only leftward and rightward movement (reference number 510) and upper and lower movement (reference number 520), the horizontal movement is not limited thereto. Of course, the horizontal movement can include various loci and directions according to the movement of the end part of the finger, such as rotational movement.

The vertical movement indicates the user's action allowing the finger's end part to move closely or remotely from the plane equipped with the lens unit of the camera unit 120. In other words, the vertical movement indicates the user pretending to press or release an imaginary key button for selecting a function, provided in a space within a selection range in front of the camera unit 120.

The moving locus and the formed area size according to the horizontal movement and the vertical movement are analyzed through video data corresponding external videos continuously inputted through the camera unit 120. In other words, the identity unit can recognize the changes of the moving locus and the formed area size by analyzing video data corresponding to each frame continuously inputted. As described above, for example, the center point of the detected area can be used when analyzing the formed area size, and the area size of a figure formed by the outline or the number of pixels included in the detected area can be used when analyzing the formed area size.

At this time, an information displaying status of the display unit 110 can be changed and displayed according to the recognized moving locus of the end part of the user's finger. For example, when the non-contact function mode in accordance with the present invention is started, if a pointer similar to a mouse pointer is displayed on the display unit 110, the pointer can be moved and displayed corresponding to the moving locus of the detected area. Beside that, as illustrated in FIG. 2, in case that the selected information item (e.g. a menu icon) is relatively enlarged and displayed, an information item corresponding to the recognized moving locus of the detected area is allowed to be relatively enlarged and displayed (e.g. if it is recognized that the detected area leftward moves, the left-located information item is allowed to be enlarged and displayed). Of course, the method for displaying the information item corresponding to the moving locus of the detected area can be variously provided as using different color or font size or as being turned on and off, for example.

Accordingly, the user can allow the pointer to be moved and located at an information item corresponding to a function desired to be selected, released or executed (or the information item to be selected) by horizontally or rotationally moving the end part of the finger in a direction toward the information item.

In this case, the information items in the information item display area 111 can be also separately displayed (moved) one after another by making the identical locus corresponding to the moving locus of the finger's end part in the inputted video of each frame. Through this, the user can non-contactly select a desired function more quickly and exactly. Also, as described above, the moving width of the pointer can be allowed to be determined corresponding to the distance (e.g. the distance between the finger's end part and the camera unit) formed with the detected area.

In case that the user attempts to select a desired information item, the pointer is allowed to be located at the information item through the aforementioned operations. Then, the finger's end part is allowed to move within the selecting range like the reference number 530 of FIG. 5. The vertical moving operation corresponds to the user's operation pretending to press a key button, through which the processor 150 can recognize that the information item located with the pointer is selected by the user. In this case, the pertinent item can be displayed with its different color or font size in order to display that the information item is selected. Of course, as described above, the size of the detected area must be changed at a rate identical to or larger than a predetermined rate in order that the processor 150 can recognize the change as the selecting command of the information item.

Beside that, the user can execute to release a selected information item by using the non-contact function mode. In case that the user, who has selected at least one information item, attempts to release some of the selected items, the user can the pointer on the selected information item and then release the information item by moving the finger's end part in a reverse direction of the reference number 530. This can be determined by recognizing that the formed area size of the detected area is decreasing in the continuous frame. Similarly, as described above, the size of the detected area must be changed at a rate identical to or larger than a predetermined rate in order that the processor 150 can recognize the change as the selection releasing command of the selected information item.

The case that the user releases the selected information item or the selected functional menu will be described blow by making an example of the operation that the user deletes contact information stored in a telephone book. To collectively delete a plurality of contact information, the plurality of contact information can be selected (e.g. selected by determining any one contact information and by performing a pressing operation) by the aforementioned method. Then, in the case of being desired to release any one of the selected contact information to store the desired contact information, the selection of the desired contact information can be released by allowing the pointer, for example, to be located at the desired contact information and then the finger's end part to move in a reverse direction of the reference 530. This will be able to be determined by recognizing that the formed area size of the detected area is decreasing in the continuous frame.

Here, the processor unit 150 can use the changed rate of the formed area size of the detected area to more exactly determine whether to select the non-contact function. For example, in case that the changed rate per size of the area, photographed with the pointing-means in the inputted area of each frame inputted within a predetermined time, is the same as or larger than a predetermined range (rate), the processor 150 recognizes the size change as being non-contractly selected with a function (i.e. vertically movement) such as the pressing or releasing command.

It can be exactly determined whether to select the non-contract function regardless of any type of the pointing-means, used by the user, by using the changed rate per size of the area. For example, in the case of using pointing-means intrinsically having a light emitting unit provided in its end part, the size of the detected area will be increased or decreased according to the decreasing or the increasing of the distance between the pointing-means and the camera unit 120. This is because since light, emitted from the light emitting unit intrinsically equipped in the pointing-means, is directly inputted to the camera unit 120, an area detected with a specific brightness component in the inputted area can be formed in proportion as e distance between the pointing-means and the camera unit 120. Accordingly, if the changed rate of the size of the detected area is used for this case, it can be exactly determined whether to select the non-contract function regardless of whether the size of the detected area is increased or decreased according to the decreasing of the distance between the pointing-means and the camera unit 120

In addition, it shall be obvious that any method using the size change and the location change of the area, occupied by the detected area, corresponding to the finger's end part in inputted video of each frame can be applied to the present invention regardless of its realizing method. For example, in case that the area, occupied by the detected area in each video frame inputted within a predetermined period of time is increased and then decreased in a rate identical to or larger than a predetermined rate as the user takes an action such as pretending to click a button with his or her finger, this case will be recognized as being selected with the non-contact function. In other words, for the case, it is determined that if the user completes the action, allowing the pointing-means to be located inside a predetermined selecting range and then to be located outside the selecting range, within a predetermined period of time, the non-contact function is selected.

Also, the user can input an executing command of an information item located with the pointer by using the non-contacting function mode. The user can execute a desired information item, by locating the pointer on the desired information item and moving the finger's end part in a direction of the reference number 530 and then moving the finger's end part reversely in the direction of the reference number 530. This can be determined by recognizing that the formed area size of the detected area is gradually increasing and then is continuously decreasing in the continuous frame. Of course, the size of the detected area must be changed at a rate identical to or larger than a predetermined rate in order that the processor 150 can recognize the change as the executing command of the information item.

The change of the distance formed with the detected area is accompanied in the operation performed with the selecting, releasing or executing command of the aforementioned information item. In this case, the moving width of the pointer is determined corresponding to the distance formed with the detected area. The user can move his or her finger in a direction of the reference number 530 and reversely in the direction of the reference number 530 in order to a moving width for horizontal movement of the pointer. The distance formed with the detected area can be measured by recognizing the change of the formed area size of the detected area in the continuous frames. Of course, in case that the user moves his or her finger, for example, in a direction of the reference number 530 to minutely adjust the moving width of the pointer, it shall be obvious that the size of the area must be changed at a rate smaller than the rate, determined to be recognized as the selecting command, in order to identify the minute adjustment separately from the selecting command of the information item. In the meantime, the moving width of the pointer can be increased by moving his or her finger, for example, reversely in a direction of the reference number 530. Since the adjusting of the moving width of the pointer is separated from the horizontal movement of the pointer, both of them can be simultaneously performed.

The moving width of the pointer can be controlled regardless of the distance formed with the detected area by another method for controlling the moving width in accordance with another embodiment of the present invention. Only in case that the user inputs a pointer moving width controlling command through input means (e.g. the side key 132 of a mobile communication terminal) equipped in the digital processing device 100, the moving width can be differently controlled. For example, the pointer can be allowed to be minutely moved while the user presses the side key 132 equipped in the digital processing device 100. Of course, the moving width of the pointer can be allowed to be increased. Alternatively, if the side key 132 is pressed one time, the pointer can be allowed to be minutely moved, and if the side key 132 is pressed again one time, the minute movement of the pointer can be released.

Figure 6:
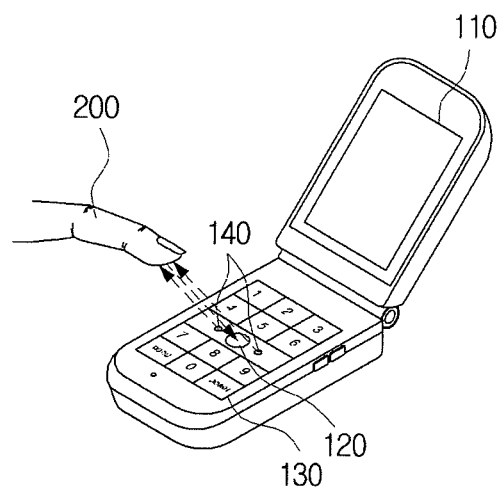
FIGS. 6 and 7 illustrate an external appearance of a mobile communication terminal and a using state of a non-contact function mode in accordance to another embodiment of the present invention.
Figure 7:
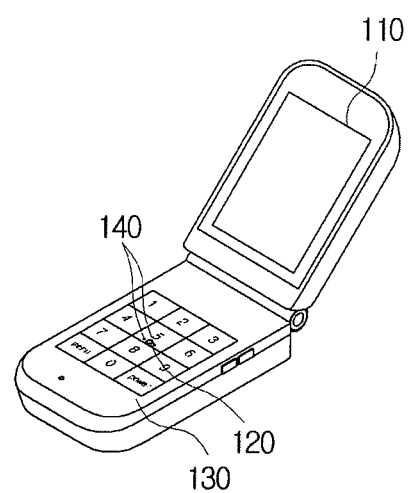

FIGS. 6 and 7 illustrate an external appearance of a mobile communication terminal and a using state of a non-contact function mode in accordance to another embodiment of the present invention.

Referring to FIG. 6 instead of FIG. 2, the camera unit 120 and the key input 130 are located on a predetermined space in a key pad. Of course, in this case, the principle of selecting the non-contact function in accordance with the present invention can be applied to the present invention. However, by arranging the camera unit 120 and the light source 140 as illustrated in FIG. 6, some operations of the aforementioned operations for selecting the non-contact function can be omitted.

For example, a focus of the camera unit 120 and a light emitting angle of the light source 140 can be predetermined such that imaginary key buttons formed on a space in a selecting range can one-to-one correspond to a location of each numerical button actually formed in the key pad. In this case, it will be unnecessary that the user horizontally move the finger's end part to a location displayed with the desired function (information item). In other words, the user can select a pertinent function (telephone call function) by directly locating the finger's end part on a numerical button (e.g. #1 button) identical to a pertinent number (e.g. 1 in the case of FIG. 2) corresponding to a desired information item (e.g. telephone call icon).

Of course, it can be recognized as being selected with the pertinent key button the detected area has a size identical to or larger than a predetermined size corresponding to a location of each key button, as the finger goes far away from the digital processing device 100 after one key button is pressed, and then, a next key button is pressed when key buttons are typically pressed one after another. In other word, in this case, all aforementioned operations of FIG. 3 through FIG. 5 can be performed. However, since the horizontal moving locus of the finger's end part is shorten by the user, the effort of the processor 150 according to the analyzing of the inputted video can be reduced a lot.

Unlike FIG. 6, FIG. 7 illustrates that the camera unit 120 and the light source 140 are not independently located on a predetermined space in the key pad formed with the key input unit 130 but shares one key button area. Since the camera unit 120 and the light source 140 are minimized, they can be formed on an area of one key button (e.g. #5 button), through which it can be unnecessary to occupy an additional area.

Figure 8:
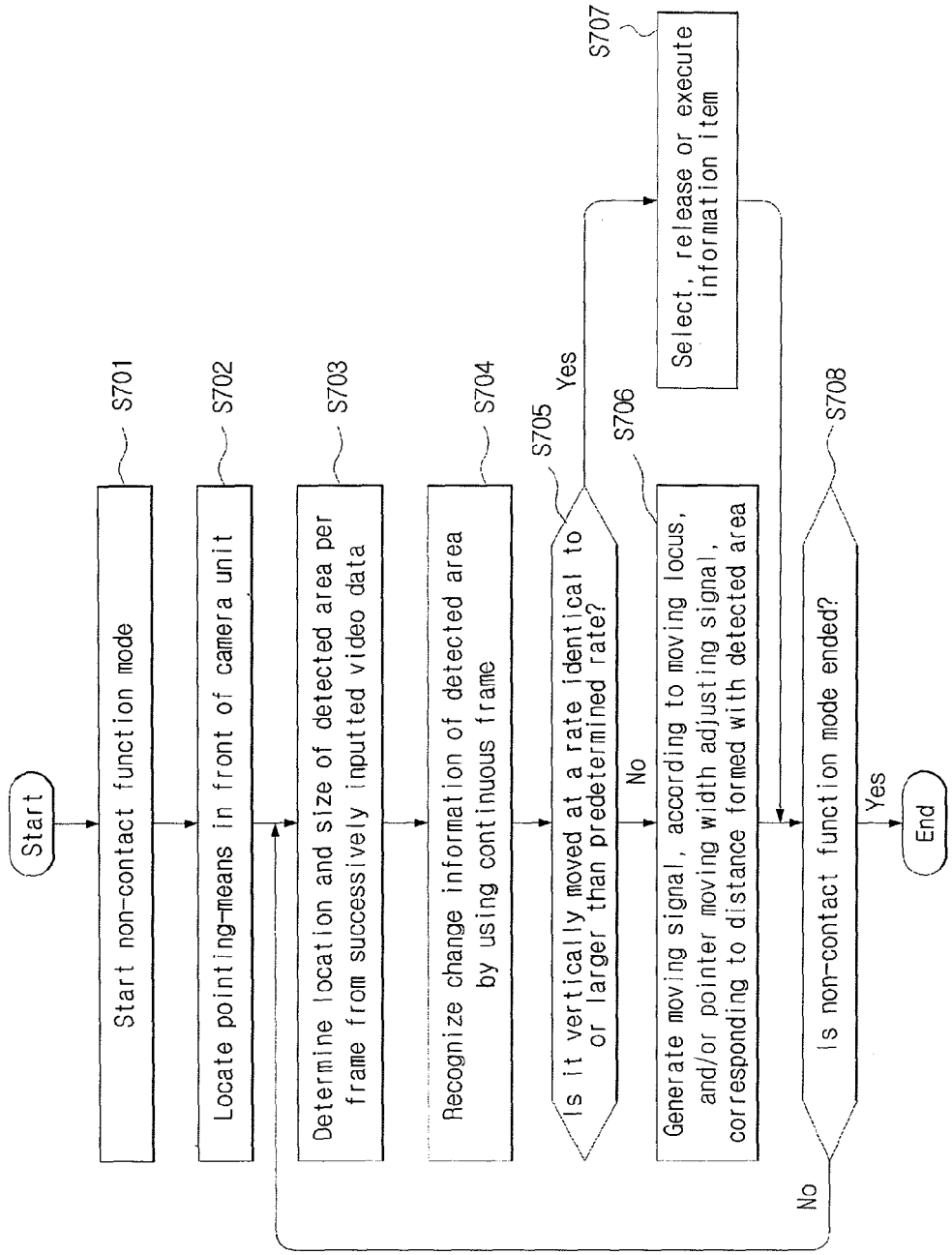
FIG. 8 is a flow chart illustrating a performing operation of a non-contact function mode of a mobile communication terminal in accordance to an embodiment of the present invention.

FIG. 8 is a flow chart illustrating a performing operation of a non-contact function mode of a mobile communication terminal in accordance to an embodiment of the present invention.

In a step represented by S701, the user firstly directs to execute a non-contact function mode in the digital processing device 100 a method such as pressing a predetermined button (e.g. a menu button) of the key input unit 130.

As described above, the processor 150 can control not only the start of the non-contact function mode but also an operation of at least one of the display unit 110, the camera unit 120, the video processing unit 125 and the light source 140. For example, the processor 150 can direct to stat to output a video signal corresponding to an external video to the camera unit 120 and direct to turn on the light source 140. The processor 150 can also control an initial screen to be converted into a screen including an information item displaying area 111 and to be displayed through the display unit 110. Here, the light source 140 emits light having a specific wavelength and/or luminance, and the camera unit 120 generates and outputs a video signal corresponding to a real-time external video or continuously photographs a subject at intervals of a predetermined time. Here, the continuous photographing operation can be performed by a preview mode receiving video information or a capture mode continuously photographing the subject.

In a step represented by S702, the user locates pointing-means, such as a finger, in front of the camera unit 120 and moves the pointing-means horizontally or vertically. A video signal corresponding to the movement of the pointing-means is generated and inputted into the video processing unit 125. The video processing unit 125 generates and outputs video data for analyzing and generating change information (e.g. a moving locus and/or the size change of the formed area) of the detected area.

In a step represented by S703, the identity unit recognizes a location and size of the detected area by analyzing video data, successively inputted, per each frame. As described above, the detected area is recognized by analyzing an external video formed by the light, emitted from the light source 140, reflected by the pointing-means and inputted into the camera unit 120. Also, the detected area, as described above, the detected area can be recognized by the property of the light (e.g. wavelength and/or luminance) emitted from the light source 140.

In a step represented by S704, the identity unit recognizes a moving locus (i.e. horizontal movement or vertical movement) by using the moving locus of the pointing means and the successive size change of the formed area, recognized through earlier steps in each video frame. As described above, the identity unit can recognize the horizontal movement of the pointing-means by using, for example, the location change of the center point of the detected area and the vertical movement of the pointing-means by using the size increasing (or change rate) of the detected area. The identity unit, as described above, can perform the recognizing of the detected area and the generating of the change information by using an image mapping program stored in the memory unit 155. The method for recognizing a function non-contactly selected by using the image mapping program will be described in detail with reference to FIG. 9 through FIG. 11.

In a step represented by S705, the processor 150 determines whether the pointing-means vertically moves in a rate identical to or larger than a predetermined rate (e.g. an increasing or decreasing rate of the area size per unit time). As described above, it will be necessary for the processor unit to determine whether the pointing-means is horizontally moved in order to determine, for example, whether a selected information item is changed to another item or whether a location of the pointer must be changed and displayed. This will be separately described below with reference to the pertinent drawings.

If the size of the detected area is changed at a rate identical to or larger than a predetermined rate, since the size change is to select, release or execute an information item located with the pointer, the processor 150 controls each element to perform a processing corresponding to the step represented by S707. For example, as illustrated in FIG. 2, when the pointer is located in the 'telephone' area, if the pointing-means vertically moves in a direction of accessing the lens unit, it can be displayed that the 'telephone' function is selected (e.g. the 'telephone' area can be enlarged or can have different color font. Also, when the 'telephone' function is selected, if the pointing-means vertically moves in a direction of being far away from the lens unit, it can be displayed that the 'telephone' function is released. If the two operations continuously performed, since the two operations are to execute the information item located with the pointer, the processor 150 controls each element to perform a processing corresponding to the step represented by S707. For example, the digital processing device 100 functioning as a mobile communication terminal will start a function mode for performing a telephone function.

If the size of the detected area is changed in a rate smaller than a predetermined rate, since the size change is to adjust a moving width of the pointer corresponding to the distance formed with the detected area, the processor 150 controls each element to perform a processing corresponding to the step represented by S706. For example, if the pointing-means vertically moves in a direction of accessing the lens unit or makes a vertical movement including a horizontal movement, a minute movement can be made by decreasing the moving width of the pointer.

However, if the pointing-means horizontally moves, since the movement is to change a location of the pointer moving on the display unit 110, the processor 150 controls each element to perform a processing corresponding to the step represented by S706. For example, as illustrated in FIG. 2, when the pointer is located in the 'telephone' area, if the pointing-means horizontally right moves, the pointer will move toward the 'message.' In this case, the moving width of the pointer is determined corresponding to the distance formed with the detected area. Also, the information item pointed by the pointer in the horizontal moving operation of the pointer can be enlarged and displayed in order to more clearly display the information item pointed by the pointer. At this time, it shall be obvious that the information item pointed by the pointer must be displayed separately from being selected with the information item (e.g. a shadow processing of enlarged information item).

In a step represented by S708, the processor 150 can determine whether the non-contact function mode is ended. For example, the ending of the non-contact function mode will be able to be performed by a predetermined functional button or the input of the menu item. If the ending of the non-contact function mode is directed, the pertinent steps are ended. Otherwise, the step represented by S703 is advanced again.

Figure 9:
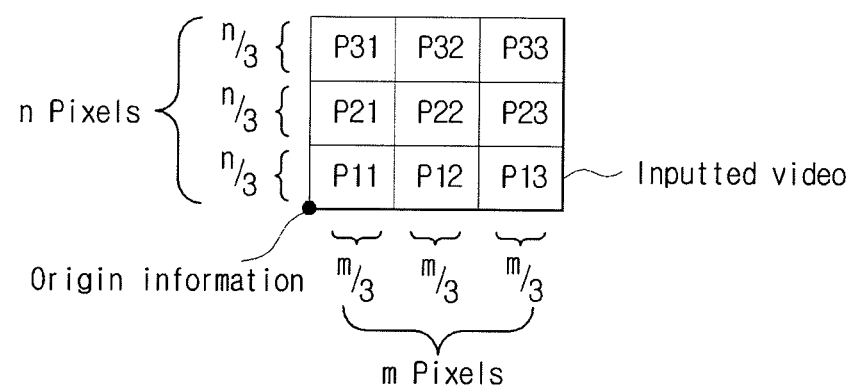
FIG. 9 is an example illustrating an image mapping method between video data and an item displaying area in accordance with an embodiment of the present invention.
Figure 11:
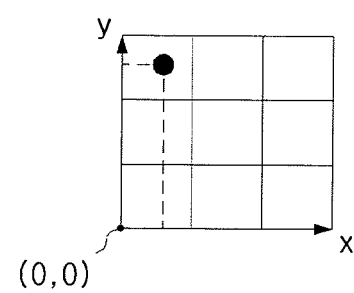
FIG. 11 is an example illustrating a method for recognizing a function non-contactly selected by using an image mapping method of FIG. 9.

FIG. 9 is an example illustrating an image mapping method between video data and an item displaying area in accordance with an embodiment of the present invention, FIG. 10 is an example illustrating a table of an image mapping program realizing an image mapping method of FIG. 9, and FIG. 11 is an example illustrating a method for recognizing a function non-contactly selected by using an image mapping method of FIG. 9.

Referring to FIG. 9, video data processed by the video processing unit 125 has a regular size (e.g. m horizontal pixels and n vertical pixels). As such, it can be performed in advance with the operation converting the video data into data having the standardized size and type (e.g. the size and type having pixel numbers identical to the information item display area 111) capable of being analyzed by the image mapping program, in order to exactly recognize coordinate information according to the movement of the pointing-means in the non-contact function mode. This conversion of the inputted video can be performed by the video processing unit 125 or the identity unit by the control of the processor 150.

In this case, not only the video data but also center point information of the video data can be stored in a video memory. The center point information can be used as reference information for allowing the identity unit to receive a coordinate value corresponding to the detected area in the video data. The center point information can be predetermined as any one of each angular point information of the inputted video. Also, the coordinate information corresponding to the detecting information can be the center point of the recognized detected area.

Here, the coordinate information (P11 through P33) of each partitioned area partitioned with the video data can be determined to be one-to-one mapped to each function (information item).

FIG. 10 is a table illustrating the image mapping program for determining a coordinate of the detected area in the video data. The below description related to the image mapping program is merely an example.

Also, the table of FIG. 10 assumes that the information item displaying area 111 is partitioned into 9 partial sections (i.e. a separate function). Accordingly, the image mapping program can be changed corresponding to the number of the functions displayed on the information item displaying area. A coordinate plane of FIG. 11 assumes that the angular point information in a left lower part is selected as center point information of the video data. Accordingly, the image mapping program can be changed in the case of selecting another center point information.

The method for recognizing the selecting of the non-contact function through the image mapping program in accordance with the present invention will be hereinafter described with reference to FIG. 9 and FIG. 10. At this time, the coordinate of the detected area is indicated as (x, y), the coordinate related to origin information (hereinafter, referred to as the 'origin') is determined as (0,0). Here, x refers to a length component value of a horizontal direction based on the origin (i.e. horizontal pixel numbers), and y refers to a length component value of a vertical direction based on the origin (i.e. vertical pixel numbers).

When x is between 0 and m/3, exclusive of 0 and m/3, if y is between 0 and 3/n, exclusive of 0 and 3/n, the coordinate information related to all corresponding coordinate values (x, y) is recognized as P11, if y is between 3/n and 2n/3, exclusive of 3/n and 2n/3, the coordinate information related to all corresponding coordinate values (x, y) is recognized as P21, or if y is between 2n/3 and n, exclusive of 2n/3 and n, the coordinate information related to all corresponding coordinate values (x, y) is recognized as P31.

Also, when x is between m/3 and 2m/3, exclusive of m/3 and 2m/3, if y is between 0 and 3/n, exclusive of 0 and 3/n, the coordinate information related to all corresponding coordinate values (x, y) is recognized as P12, if y is between 3/n and 2n/3, exclusive of 3/n and 2n/3, the coordinate information related to all corresponding coordinate values (x, y) is recognized as P22, or if y is between 2n/3 and n, exclusive of 2n/3 and n, the coordinate information related to all corresponding coordinate values (x, y) is recognized as P32.

In addition, when x is between 2m/3 and m, exclusive of 2m/3 and m, if y is between 0 and 3/n, exclusive of 0 and 3/n, the coordinate information related to all corresponding coordinate values (x, y) is recognized as P13, if y is between 3/n and 2n/3, exclusive of 3/n and 2n/3, the coordinate information related to all corresponding coordinate values (x, y) is recognized as P23, or if y is between 2n/3 and n, exclusive of 2n/3 and n, the coordinate information related to all corresponding coordinate values (x, y) is recognized as P33.

Accordingly, FIG. 11 illustrates that in the coordinate value (x, y) of the detected area (assumed as a block colored point), x is between 0 and m/3, exclusive of 0 and m/3 and y is between 2n/3 and n, exclusive of 2n/3 and n. Accordingly, the processor 150 recognizes that the detected area is located in the P31 by using the imaging mapping program. Thus, the identity unit can input recognition information, for allowing an information item corresponding to the pertinent partitioned area information P31 to be designated and displayed (referring to FIG. 2) into the processor 150. When the pertinent information item is designated and displayed, if the size of the detected area is increased at a rate identical to or larger than a predetermined rate, the processor 150 can recognize that the information item designated by the recognition information from the identity unit is selected. Also, when the pertinent information item is designated and displayed, if the size of the detected area is decreased at a rate identical to or larger than a predetermined rate, the processor 150 can recognize that the information item designated by the recognition information from the identity unit is released. In addition, when the pertinent information item is designated and displayed, if the size of the detected area is increase and then decreased at a rate identical to or larger than a predetermined rate (e.g. an action similar to the click of the mouse), the processor 150 will execute a function (a telephone call in the case of FIG. 2) corresponding to the information item designated by the recognition information from the identity unit.

Figure 12:
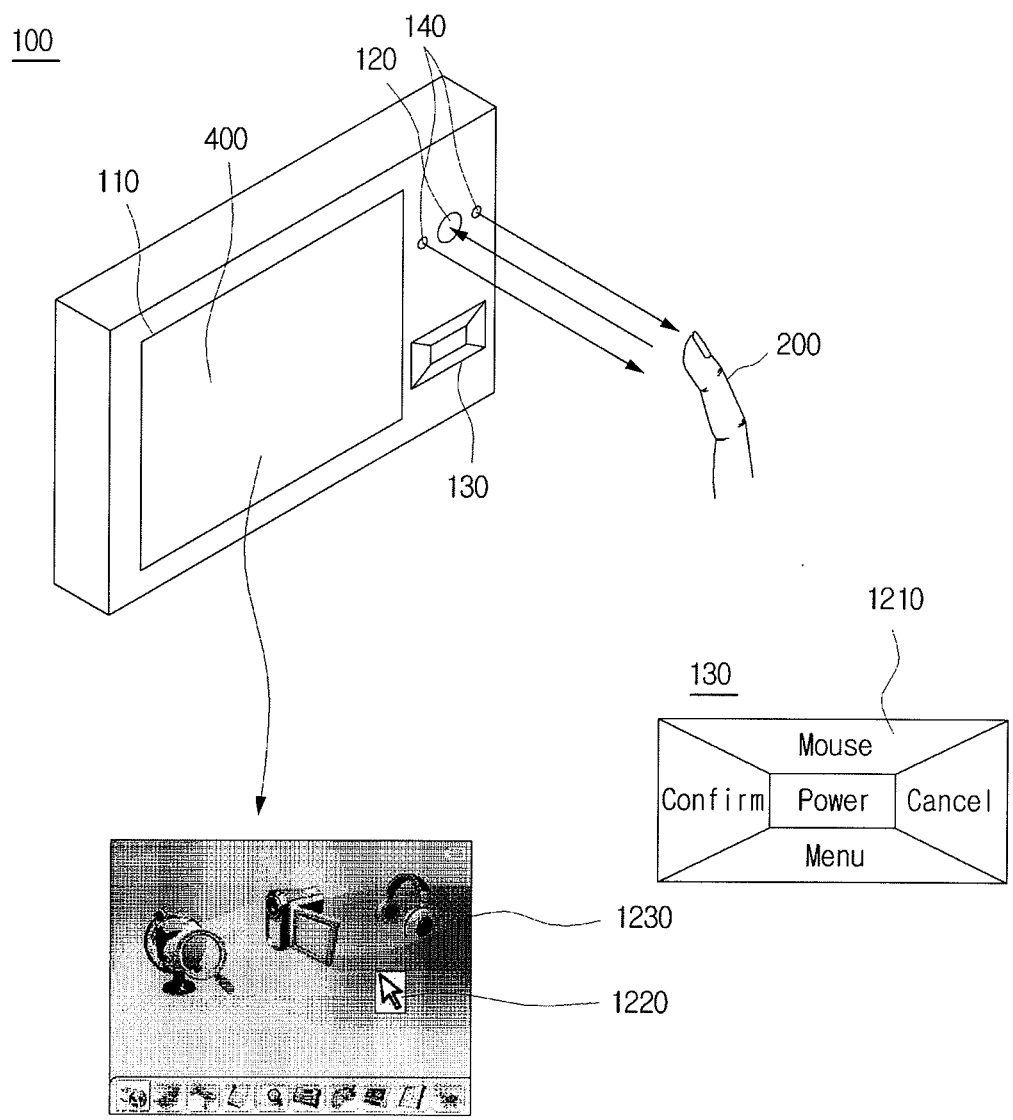
FIG. 12 illustrates an external appearance of a digital processing device and a using state of a non-contact mouse function mode in accordance with another embodiment of the present invention.

FIG. 12 illustrates an external appearance of a digital processing device and a using state of a non-contact mouse function mode in accordance with another embodiment of the present invention.

Referring to FIG. 12, which illustrates a portable multimedia device as an example of the digital device 100, the portable multimedia device can include the display unit 110, the camera unit 120, the input unit 130 and the light source 140.

Even though FIG. 2 illustrates that the camera unit 120 (i.e. the lens unit exposed to an outside) is equipped with the light sources 140, respectively, in each opposite part, one by one, the number of the mountable light sources is not limited.

Also, the light source 140 can be omitted in a specific case. For example, in case that it can be possible to input a control command in the non-contact function mode in accordance with the present invention by using pointing-means (e.g. pointing-means realized as a stylus pen) including a light-emitting unit capable of emitting light having a specific wavelength and/or luminance to an end part, the light source 140 can be omitted. This is because the change of the detected area can be identified by analyzing a location and/or range of a pixel, corresponding to the wavelength of light emitted from the light-emitting unit equipped in the pointing-means, in the video data of each frame inputted through the camera unit 120 and processed by the video processing unit 125. However, the below description is based on the case that the light source 140 is provided in the digital processing device 100.

Here, the location equipped with the camera unit 120 can be different from that illustrated by FIG. 2. Of course, the camera unit 120 can be mixably used for general video photographing as well as the performance of the non-contact function mode in accordance with the present invention. However, the below description is based on the case that the camera unit 120 is used for performing the non-contact mouse function. This is because the photographing usage of the camera unit 120 can be easily separated by separating a control signal transferred from the processor 150. This is to restrict to the losing of the unnecessary power and to the decreasing of the processing efficiency by performing an only operation for recognizing the change of the detected area without necessary to perform all processes for which the video processing unit 125 displays a preview video on the display unit 110. For this, the processor 150 can provide a control signal corresponding to how to use a video signal currently inputted into the camera unit 120 and/or the video processing unit 125. For example, in case that a user directs to execute the non-contact function mode, the non-contact function mode can be executed instead of the typical video photographing by transferring to a particular control signal corresponding to the non-contact function mode to the camera unit 120 and/or the processing unit 125. Similarly, in case that the user directs the general video photographing function, the losing of the unnecessary power and the decreasing of the processing efficiency can be restricted because all processing operations for analyzing the detected area and recognizing its change is not performed by transferring to a particular control signal corresponding to the photographing of the typical video to the camera unit 120 and/or the processing unit 125. The light source 140 emits light having a specific wavelength at a predetermined light-emitting angle. The emitted light is reflected by pointing-means 200 (e.g. an end part of a user's finger) and gathered into the camera unit 120. Accordingly, a light emitting angle of the light source 140 is preferably predetermined as the angle, the light emitted at which is reflected by the pointing-means 200, regularly spaced away from the portable multimedia device 100, such that the light can be inputted through the camera unit 120 (referring to FIG. 3 and FIG. 4).

Here, the light source 140 can be controlled to be operated only if there is a direction by the processor 150. For example, only if the user selects the non-contact mouse function mode by pressing a 'mouse' button 1210 of the input unit 130, the processor 150 can control the light source 140 to be turned on. This makes it possible to prevent unnecessary power loss of a battery that can be generated by emitting light all the time because the light source 140 has always been turned on. The operation (photographing) of the camera unit 120 will be also able to be controlled by the same method. In other word, a video of the pointing-means through the camera unit 120 can be controlled to be inputted only if the non-contact mouse function mode is selected.

Of course, in case that the digital processing device 100 in accordance with the present invention is equipped with an additional moving recognizing sensor (e.g. a motion sensor), the digital processing device 100 can use the moving recognizing sensor to select the non-contact function mode. In other words, if a user takes a particular action (e.g. waves a hand twice within 1 second), the moving recognizing sensor senses the action and transfers a sensing signal to the processor 150, At this time, the processor 150 can control the operations of the light source 140, the camera unit 120 and/or the video processing unit 125 by determining that the user selects the non-contact function mode through the transferred sensing signal.

However, the below description assumes that it is determined through the mouse button 1210 of the input unit 130 whether to select the non-contact mouse function mode and that the light source 140 and the camera unit 120 are controlled to be operated in the only case of the starting of the non-contract mouse function mode.

The camera unit 120 continuously photographs (e.g. performs a preview mode or continuous photographing in a capture mode) the pointing-means at intervals of a predetermined time. The continuously photographed video data of each frame can be stored in the memory unit 155. As such, the processor 150 can recognize the non-contact mouse function according to a moving locus of the pointing-means by analyzing the corresponding inputted image of each frame. The method for recognizing the non-contact mouse function by analyzing the corresponding inputted image of each frame will be described in detail with reference to the below drawings. Here, the inputted video can be RGB video data or YUV data, into which the RGB video data is converted by the video processing unit 125.

The input 130 provides a typical user interface, for inputting data or for selecting a menu function. However, the input unit 130 illustrated in FIG. 12 is not equipped with various kinds of functional buttons (e.g. an Internet accessing button and a music playback button) for selecting a menu, provided on an input unit of a typical digital device and direction key buttons for menu moving. This is the reason why the menu function selection of the present invention can be performed by using the non-contact mouse function.

Of course, some functional buttons, necessary for providing the convenience to a user or performing a function (e.g. a power turn-on function of the digital processing device), which is unable to be recognized through the menu selection by using the non-contact mouse function in accordance with the present invention, can be included in the key pad. In other words, it shall be obvious that the structure and type of the key input unit 130 in accordance with the present invention, which must be determined by versatilely considering the requirement of a user, the convenience of function selecting, and the efficiency of the design of the digital processing device, can be varied in addition to the type illustrated in FIG. 12. Like this, the device having the non-contact mouse function in accordance with the present invention can minimize the portable multimedia device and makes it possible to vary its design because the portable multimedia device can remove the space as much as that occupied by the functional button, for example, or use the space for another usage.

In case that a user directs to start a non-contract mouse function mode, the display unit 110 of the present invention can display the menu icons on the whole part or some part (hereinafter, referred to as a 'menu icon display area 1230' of a screen. For example, when the non-contact mouse function mode is started, at the same time, an initial screen of the display unit 110 can be converted into a screen including the menu icon display area 1230, illustrated in FIG. 12. Of course, it is obvious that the screen, itself, including the menu icon display area 1230 can be used as the initial screen. The below description assumes that the whole part of the display unit 110 is converted into the menu icon display area 1230 and displayed in case that the non-contact mouse function mode is selected.

Here, the menu icon display area 1230 can be displayed with whole parts or some parts of menu icons corresponding to each function equipped in the digital processing device (e.g. portable multimedia device). The menu icons in the menu icon display area 1230 can have various types and arrangements. It shall be obvious that the present invention is not limited to the type and arrangement illustrated in FIG. 12.

Also, the menu icon display area 1230 can be further displayed with a mouse cursor 1220 for moving to the menu icon and selecting the menu icon in addition to the menu icon. When the screen of the display unit 110 is converted into the screen including the menu icon display area 1230, at the same time, the mouse cursor 1220 can be displayed on a predetermined location. Alternatively, it can be predetermined that when the pointing-means is firstly detected from the inputted video, at the same time, the mouse cursor 1220 is displayed on a location of the menu icon display area 1230 corresponding to the detected location. However, the below description assumes that the mouse cursor 1220 is displayed on the menu icon display area 1230 by the latter (i.e. displayed, at the same time, when the pointing-means is firstly detected from the inputted video. Of course, the mouse cursor 1230, which is to make it easy for the user to select any item (e.g. a menu item and an information item) displayed on a displaying screen, can allowed not to be displayed in case that the displaying order (e.g. a displaying type to be displayed as main information in order to activate a menu item located leftward or rightward from the currently-displayed menu item when the pointing-means moves leftward or rightward) of the menu item to be displayed in order to be activated according to the moving locus of the pointing-means is predetermined.

The mouse cursor 1220 moves in the menu icon display area 1230, corresponding to the movement (i.e. a moving locus) of the pointing-means in front of the camera unit 1220, with drawing the same locus as the movement of the pointing-means. In other words, this can make the same effect as if the user moves the mouse cursor 1220 displayed on the screen by using a wire mouse, which can be realized by analyzing the location change of an area photographed with the pointing-means in the inputted video successively generated from the camera unit 120. The method for realizing the non-contact mouse function will become more apparent through the below description related to the pertinent drawings.

Figure 13:
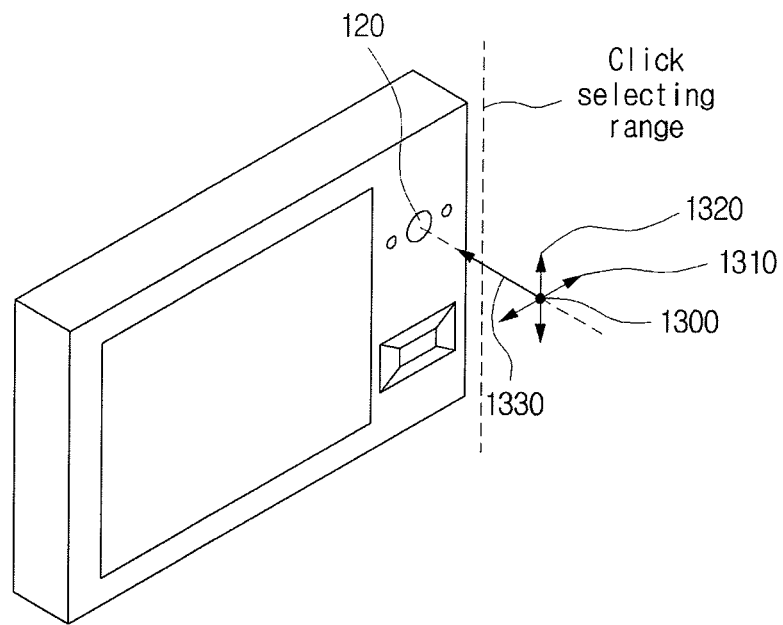
FIG. 13 illustrates a using state of a non-contact mouse function mode of a digital processing device in accordance with another embodiment of the present invention.

FIG. 13 illustrates a using state of a non-contact mouse function mode of a digital processing device in accordance with another embodiment of the present invention.

Figure 14:
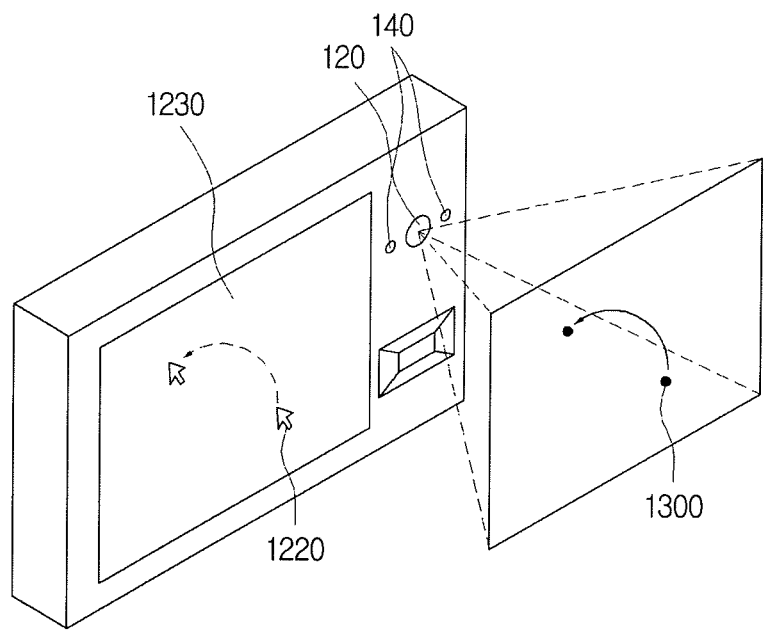
FIG. 14 is an example illustrating a principle of moving a mouse cursor according to a non-contact mouse function of FIG. 13.

FIG. 13 illustrates that the user uses the non-contact mouse function in accordance with the present invention by using the pointing-means 200 after selecting the non-contact mouse function mode. FIG. 14 and FIG. 15 also illustrate the same case. Any object is not required to meet a specific condition in order to be used as the pointing-means 200. However, the description related to FIG. 13 through FIG. 15 assumes that the pointing-means is a user's finger.

Referring to FIG. 13, the point corresponding to a reference number 1300 refers to an end part of the user's finger for the convenience of description. Also, arrows corresponding to a reference number 1310 and another reference number 1320 indicate horizontal movement of the end part of the finger by the user. Another arrow corresponding to a reference number 1330 indicates vertical movement of the end part of the finger. For example, the vertical movement and the horizontal movement, respectively, can be identified by receiving a spaced distance between the camera unit 120 and the pointing-means.

Here, the horizontal movement (including rotational movement) indicates all moving locus of the end part of the user's finger outside of a click selecting range, to be described below, based on a vertical distance from the camera unit 120. Accordingly, although FIG. 13 illustrates only leftward and rightward movement (reference number 1310) and upper and lower movement (reference 1320), the horizontal movement is not limited thereto. Of course, the horizontal movement can include various loci and directions (e.g. a parabola direction and rotation direction) according to the movement of the end part of the finger. If two fingers are used as the pointing-means, the moving locus and direction of the pointing-means 200 can be recognized by assuming the moving canter point of the pointing-means as the center point of an imaginary line connecting locations identically distanced from each end part of a first finger and a second finger and referring to the movement of the center point.

The vertical movement indicates the user's action allowing the finger's end part located outside the click selecting range, to be described below, to be located (e.g. gradual-closely or remotely) inside of a click selecting range in front of the camera unit 120. In other words, the vertical movement can indicate the user pretending to click an imaginary left or right button for selecting or releasing a menu or function, provided in a space in the predetermined click selecting range in front of the camera unit 120. Beside that, if the vertical movement is repeated within a predetermined time, this can indicate the user pretending to double-click an imaginary left button for executing a desired function, provided in a space in the predetermined click selecting range in front of the camera unit 120.

The camera unit 120 continuously photographs (e.g. performs a preview mode) the moving locus (i.e. the horizontal movement and the vertical movement) of the finger's end part at intervals of a predetermined time. At this time, the processor 150 recognizes the moving locus of the finger's end part from each video frame, continuously inputted from the camera unit 120, by using the detected area of the finger's end part. The moving locus of the finger's end part, drawing the same locus, moves the mouse cursor displayed through the menu icon display area 1230 of the display unit 110. Through this operation, the user can locate the mouse cursor in a location of a desired menu icon. Beside that, the user can select or release a pertinent menu icon corresponding to a desired function or display its option information, by taking an action allowing the finger's end part to be vertically moved (reference number 1330) from the pertinent location (i.e. the same action as clicking a left or right button of the imaginary mouse, and this can be used more conveniently than the case of using end parts of a plurality of fingers and allowing the end part of any one finger to relatively be close). The method for using the non-contact mouse function will be described in detail with reference to FIG. 14.

FIG. 14 is an example illustrating a principle of moving a mouse cursor according to a non-contact mouse function of FIG. 13. In other word, FIG. 14 illustrates a principle of moving the mouse cursor 1220 on the menu icon display area 1230 according to the horizontal movement (i.e. the movement outside a predetermined click selecting range) of the finger's end part.

Referring to FIG. 14, in accordance with the movement of the finger's end part (reference number 1300) in a predetermined direction by a user, the mouse cursor 1220, displayed on the menu icon display area 1230, also moves with drawing the same locus. In other words, the mouse cursor 1220 of the menu icon display area 1230 moves according to a locus corresponding to the location change of the detected area of the finger's end part by the video inputting order of each frame inputted from the camera unit 120.

The location change of the detected area of the finger's end part by the video inputting order of each frame is performed through the analyzing of the inputted video by the processor 150. In other words, the processor 150 can recognize the moving locus of the finger's end part by firstly recognizing the location change of the detected area of the finger's end part for each successively inputted video.

Here, the center point of an area detected with the finger's end part from the inputted video can be used to recognize the moving locus of the finger's end part (i.e. the location change of the detected area according to the order of the inputted video). For example, the processor 150 will be able to recognize the moving locus of the finger's end part by computing a location of the pixel located in the center point of an area determined as being photographed by the finger's end part every inputted video and recognizing the location change of the center point according to the order of the inputted video. Also, in case that it is difficult to determine the center point of the finger's end part because an area outside of the finger's end part is photographed, the processor 150 can recognize the moving locus of the finger's end part by computing the pixel's location and its location change of the center point based on a first knuckle of the finger.

Beside that, in case that two fingers are used as the pointing-means the processor 150 can divide the area detected with each end part of a first finger and a second finger into a first detected area and a second detected area and assume the moving canter point of the movement as the center part of an imaginary line connecting the center points of an area occupied by each detected area, in order to determine a moving locus and area size rate based on the center point the movement. If the inputted video is photographed with an area outside of the end parts of the first finger and the second finger, it shall be obvious that the moving locus of the finger's end part can be determined based on the first knuckle of the finger. Also, although two fingers are used as the pointing-means, the center point of the first detected area can be used to determine the moving locus, based on the end part of the only first finger having more clear detected area according to the setting of a designer.

Of course, at this time, the video of each frame, successively inputted, can be adjusted to respectively have an identical predetermined size through the video processing unit 125 in accordance with the direction of the processor 150, in order to move the mouse cursor 1220, displayed on the menu icon display area 1230, identically according to the moving locus of the finger's end part. For example, each inputted video can be adjusted to have the size having the same pixel number as the menu icon display area 1230.

Figure 15:
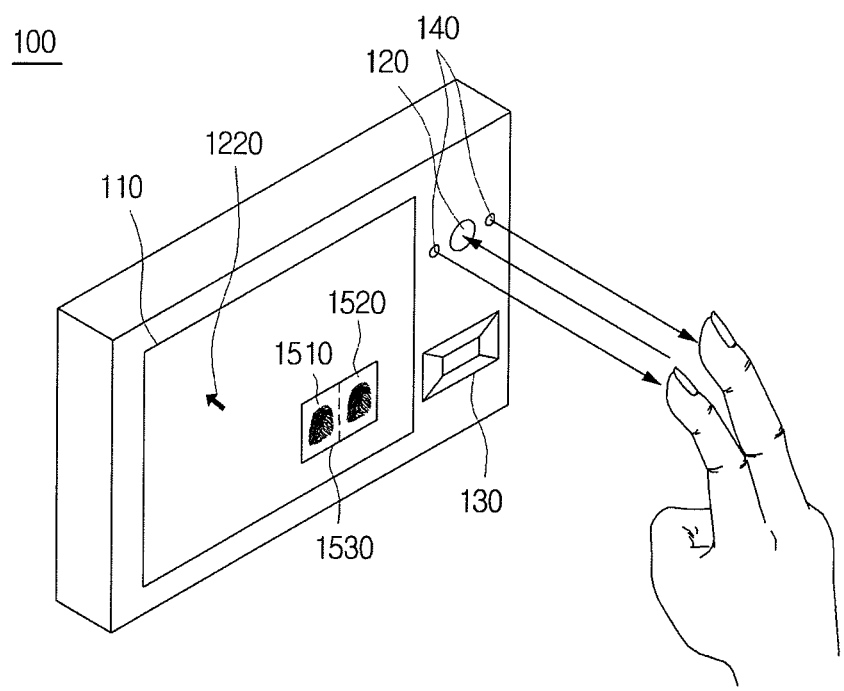
FIG. 15 is an example illustrating an operating principle of a non-contract mouse function in accordance with the present invention.

FIG. 15 is an example illustrating an operating principle of a non-contract mouse function in accordance with the present invention. FIG. 15 illustrates the operation that a user executes a non-contact mouse function in accordance with the present invention by using pointing-means 200 after the execution of the non-contract mouse function mode is started by the user.

Here, an object capable of being used as the pointing-means is not limited, and any object that can reflect light emitted from the light source 140 and input the reflected light to the camera unit 120 is sufficient. However, the below description assumes that the pointing-means is a user's finger, for the convenience of description. This will be described with FIG. 3 and FIG. 4.

The user directs to execute the non-contract function mode. Then, a user's finger is located in front of and separately from the camera unit 120. In this case, the light, having a specific wavelength, emitted from the light source 140 is reflected by the user's finger and inputted into the camera unit 120. The optical video information, inputted into the camera unit 120 is converted into a video signal and inputted into the video processing unit 125. The video processing unit 125 converts the inputted video signal into video data for analyzing the detected area and recognizing its change. The converted video data can be any one of YUV data and RGB data, for example. A view angle of the camera unit 120 and a light-emitting angle of the light source 140 can be predetermined. For example, the angle of the camera unit 120 and the light-emitting angle of the light source 140, respectively, are set as 120 degree. The angle and/or the light-emitting angle can be variously changed.

At this time, the light, reflected by the finger, of the light, having the specific wavelength, emitted from the light source 140, forms as a video on the lens unit. An area formed by the reflected light will include information, separated from another part of an input video (e.g. different wavelength or luminance). Change information (e.g. a moving locus and/or the size of a formed area) of the detected area between successive frames can be recognized by recognizing the detected area formed by the light reflected from the video data of each frame. Accordingly, the detected area will be formed corresponding to the moving locus and/or the moving direction of the finger.

For example, the identity unit can determine the detected area and recognize the change information of the detected area between each frame by performing a filtering operation allowing an only area of a specific wavelength to be detected. Alternatively, the identity unit can determine the detected area and recognize the change information of the detected area between each frame by detecting an area having a specific luminance component from the video data of each frame. The valid range of the wavelength or luminance for determining the detected area can be predetermined, and the detected area can be determined by recognizing a locations of pixels corresponding to a wavelength component or a luminance component within a pertinent range.

Here, the moving locus of the detected area can be recognized by using, for example, information related to how the center point of the detected area, formed by the reflected light, is changed in each frame. The size of the formed area of the detected area can be recognized by using, for example, the area size of a figure formed by an outline of the detected area in the video data of each frame or the number of pixels included in the detected area.

In case that the formed area size of the aforementioned detected area is different between frames, the different detected area between can be recognized as click or double-click. For example, while the mouse cursor 1220 points to any one of a plurality of information items, displayed on the display unit 110, if the size of the detected area is increased (i.e. a finger moves toward the lens unit) within a predetermined period of time, it can be recognized that the pertinent information item is selected (clicked). Alternatively, while the mouse cursor 1220 points to the selected information item in the display unit 110, if the size of the detected area is decreased (i.e. a finger moves reversely toward the lens unit) within a predetermined period of time, it can be recognized that the pertinent information item is released. For another example, in case that the user takes the same action as if the user clicks a button by using his or her finger while the mouse cursor 1220 points to any one of a plurality of information items, displayed on the display unit 110, if the detected area in each video frame inputted within a predetermined time is increased and then decreased at a rate identical to or larger than a predetermined rate, it can be recognized that the pertinent information item is selected or the selected information item is released (i.e. the same action as if a left button is clicked in a mouse). The predetermined rate can be predetermined by a designer or the user. For another example, in case that the user takes the same action as if the user clicks a button by using his or her finger while the mouse cursor 1220 points to any one of a plurality of information items, displayed on the display unit 110, if the detected area in each video frame inputted within a predetermined time is repeated to be increased and then to be decreased at a rate identical to or larger than a predetermined rate, it can be recognized that the pertinent information item is executed (i.e. the same action as if a left button is double-clicked in a mouse). The increasing or decreasing of formed area of the detected area can be determined by comparing the formed area computed in units of each frame between continuous frames.

As described above, as compared with FIG. 3, in the case of FIG. 4, the user's finger is located closer to lens unit of the camera unit 120. If it is assumed that the user's finger moves from the location of FIG. 3 to the location of FIG. 4, the detected area formed by the light reflected by the user's finger is increasing in size. In this case, the identity unit generates corresponding recognition information and inputs the generated recognition information into the processor 150, and the processor 150 can recognize the pertinent menu item as being selected and allow a function (or application) corresponding to the pertinent menu item to be driven. However, if the non-contact function mode is used while the user's finger is regularly spaced away from the lens unit, since the location of the finger can be upwardly or downwardly changed within a regular distance without intention, the standard (i.e. selecting range) for recognizing the change as pressing can be predetermined (in FIG. 4, in case that the finger is located within the range of b, it is assumed as pressing). Here, the selecting range can be predetermined as a distance before the camera unit 120 by its designer. Through this, the user can select or execute a corresponding information item by taking an action such as pretending to press an imaginary key button provided above the lens unit of the camera unit 120. At this time, the processor 150 determines whether the user selects a non-contact function through the comparison of the area formed in each video frame according to a location of the finger. In other words, in case that the size of the area, formed by the movement of the finger, in the inputted video is increasing according the successive order of each video frame, the processor 150 can consider that the user intends to select a menu item and icon. In order that although a size change rate of the detected area is large due to sloping horizontal movement outside of a predetermined spaced distance, the size change is not recognized as the vertical movement, the processor 150 determine can the vertical by measuring relative size rate and absolute spaced distance. Beside that, the processor 150 can determine whether it is vertically moved, by referring to the reference of the absolute spaced distance determining the vertical movement and converting the distance coordinate of the detected area of the inputted video frame (the converting from spherical coordinate system (, f,) to rectangular coordinate system (x, y, z)).

It can be possible by using the size change rate per area size to exactly the click selection using the non-contact mouse function, regardless of any type of the pointing-means used by the user and any size of the used pointing-means.

Although it is determined as being clicked and selected that the size of the area photographed with the pointing-means is simply increased at a rate identical to or larger than a predetermined range, of course, the method for recognizing the click selection is not limited thereto. In addition, any method using the size change of the area photographed with the pointing-means can be applied to the present invention regardless of its realizing method.

FIG. 15 is an example illustrating the method for determining the vertical movement by separating the first detected area and the second detected area.

Referring to FIG. 15, some can be separated from the video data including the detected area and displayed as a window 1530 on a part of the display unit 110 in order to determine the size change rate of the area detected with the pointing-means for some part of the video data processed by the video processing unit 125. As described above, in case that a plurality of fingers are used as the pointing-means, the mouse cursor 1220 can be displayed on a specific location (e.g. the center location) recognized by the pertinent fingers. In this case, the window 1530 can function as an information window allowing the user to recognize whether a left or right button is clicked. It shall be well-known to any person of ordinary skill in the art that the display location of the window 1530 is not limited.

As such, it can be performed in advance with the operation converting some of the video data including the detected area into data having a predetermined size and type, in order to exactly recognize the size change rate according to the vertical movement of the pointing-means in the non-contact mouse function mode. This conversion of the inputted video can be performed by the video processing unit 125 or the identity unit by the control of the processor 150.

Here, in the case of two pointing-means 200 (e.g. two fingers are used as the pointing-means), some of the video data can be displayed by including an area, detected with the first finger, set as the first detected area 1510 and another area, detected with the second finger, set as the second detected area 1520. If the size of the first detected area 1510 is changed in a direction of being increased and then decreased at a rate identical to or larger than a predetermined rate, the size change can be recognized as a selecting command of the information item located with the mouse cursor among a plurality of information items displayed on the display unit or a selection releasing command of the selected information item. Also, if the size change of the first detected area 1510 is repeated at a rate identical to or larger than a predetermined rate, the processor 150 can recognize the size change as the same action as the double-click of an imaginary mouse of the display unit 110 by the user. For example, if the size change of the first detected area 1510 is repeated in a direction of being increased and then decreased at a rate identical to or larger than a predetermined rate, the size change can be recognized as an executing start command of the information item located with the mouse cursor among a plurality of information items displayed on the display unit. Conversely, if the size change rate of the second detected area 1520 per area size is repeated at a rate identical to or larger than a predetermined rate, the processor 150 can recognize the size change as the same action as the click of a right button of an imaginary mouse of the display unit 110 by the user. For example, if the size change of the second detected area 1520 is repeated in a direction of being increased and then decreased at a rate identical to or larger than a predetermined rate, the size change can be recognized as an option information display command of the information item located with the mouse cursor among a plurality of information items displayed on the display unit.

In case that the finger's end part is used as the pointing-means, although the first detected area 1510 and the second detected area 1520 are photographed with a part outside of the end part of the finger, the processor 150 can recognize the moving locus and size change rate by considering the center point of the detected area as the center point of a first knuckle of the finger.

Figure 16:
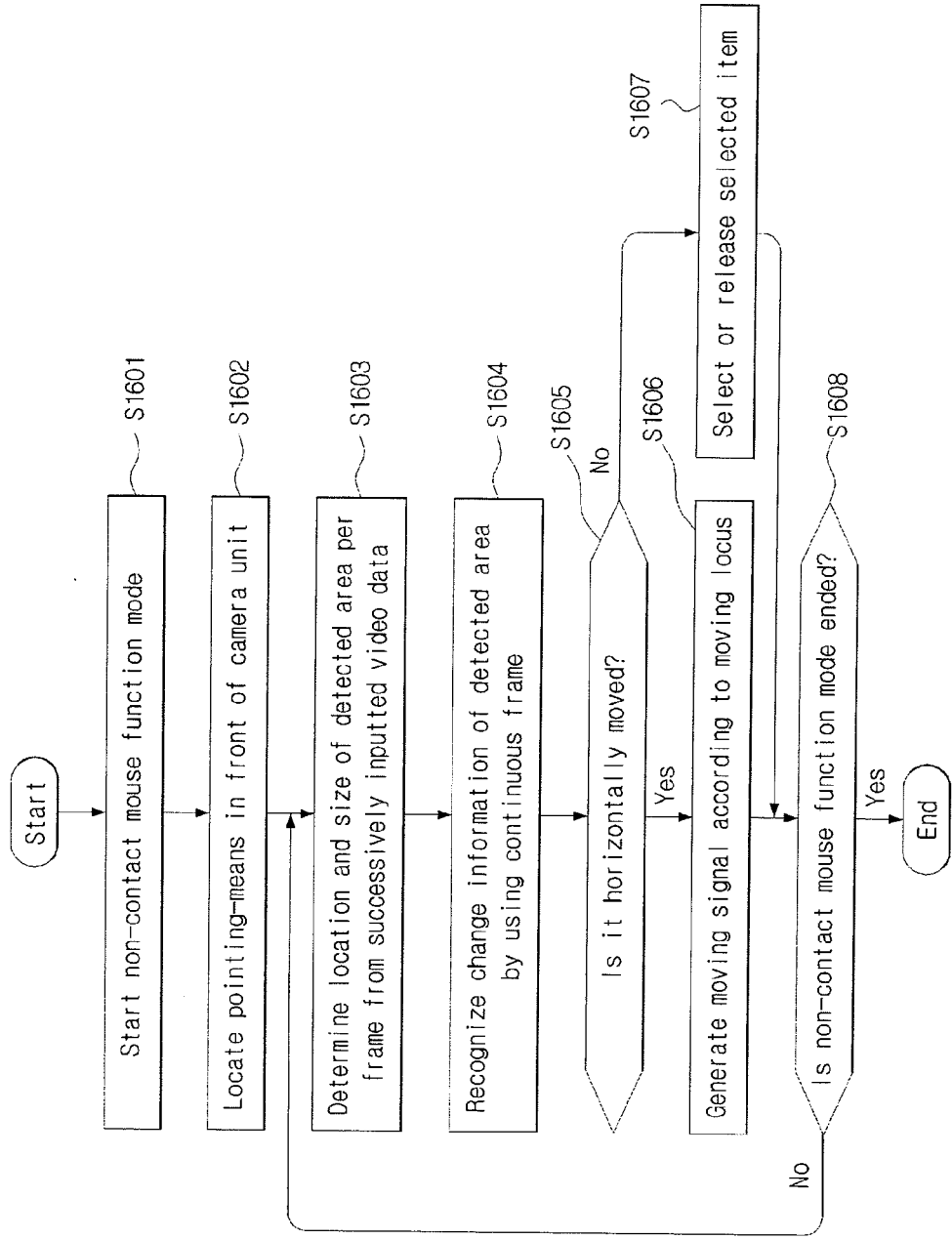
FIG. 16 is a flow chart illustrating a menu selecting method by using a non-contact mouse function in accordance with another embodiment of the present invention.

FIG. 16 is a flow chart illustrating a menu selecting method by using a non-contact mouse function in accordance with another embodiment of the present invention.

The below description related to a menu selecting method can be universally applied to not only the case of using one finger as the pointing-means but also the case of using at least two fingers.

In a step represented by S1601, a user firstly selects a non-contact mouse function mode in the portable multimedia device 100 by pressing a 'mouse button' 1210 of the input unit 130.

The processor 150 can control not only the start of the non-contact function mode but also an operation of at least one of the display unit 110, the camera unit 120, the video processing unit 125 and the light source 140. For example, the processor 150 can direct to stat to output a video signal corresponding to an external video to the camera unit 120 and direct to turn on the light source 140. The processor 150 can also control an initial screen to be converted into a screen including the menu icon display area 1230 and to be displayed through the display unit 110. Here, the light source 140 emits light having a specific wavelength and/or luminance, and the camera unit 120 generates and outputs a video signal corresponding to a real-time external video or continuously photographs (e.g. performs a preview mode) a subject at intervals of a predetermined time.

In a step represented by S1602, the user locates pointing-means, such as a finger, in front of the camera unit 120 and moves the pointing-means horizontally or vertically. A video signal corresponding to the movement of the pointing-means is generated and inputted into the video processing unit 125. The video processing unit 125 generates and outputs video data for analyzing and generating change information (e.g. a moving locus and/or the size change of the formed area) of the detected area.

In a step represented by S1603, the identity unit recognizes a location and size of the detected area by analyzing video data, successively inputted, per each frame. As described above, the detected area is recognized by analyzing an external video formed by the light, emitted from the light source 140, reflected by the pointing-means and inputted into the camera unit 120. Also, the detected area, as described above, the detected area can be recognized by the property of the light (e.g. wavelength and/or luminance) emitted from the light source 140.

In a step represented by S1604, the identity unit recognizes a moving locus (i.e. horizontal movement or vertical movement) by using the moving locus of the pointing means and the successive size change of the formed area, recognized through earlier steps in each inputted video frame. As described above, the identity unit can recognize the horizontal movement of the pointing-means by using, for example, the location change of the center point of the detected area and the vertical movement of the pointing-means by using the size increasing (or change rate) of the detected area.

In a step represented by S1605, the processor 150 determines whether the pointing-means horizontally moves by using change information of the detected area recognized by the identity unit.

If the pointing-means is horizontally moved, since the movement is to change a menu item (or information item), displayed on the display unit as being selected, into another item or to change a location of the pointer, the processor 150 controls each element to perform a processing corresponding to the step represented by S1606

However, if the pointing-means is vertically moved, since the movement is to execute or release a menu item (or information item), displayed on the display unit as being selected, or corresponding to the location of the pointer, the processor 150 controls each element to perform a processing corresponding to the step represented by S1607.

In a step represented by S1608, the processor 150 can determine whether the non-contact function mode is ended. For example, the ending of the non-contact function mode will be able to be performed by a predetermined functional button or the input of the menu item. If the ending of the non-contact function mode is directed, the pertinent steps are ended. Otherwise, the step represented by S1603 is advanced again.

Figure 17:
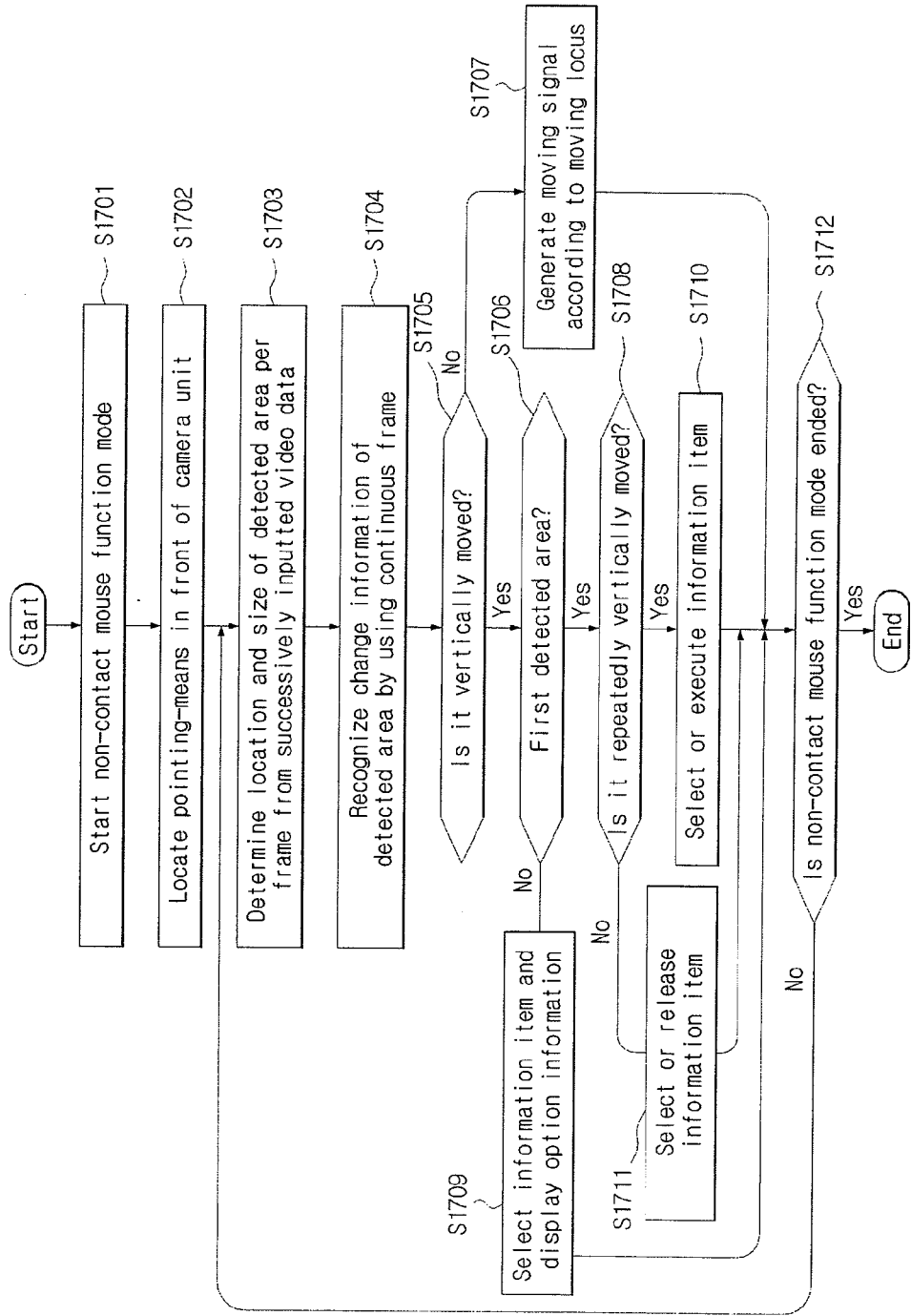
FIG. 17 is a flow chart illustrating a menu selecting method by using a non-contact mouse function in accordance with another embodiment of the present invention.

FIG. 17 is a flow chart illustrating a menu selecting method by using a non-contact mouse function in accordance with another embodiment of the present invention.

In a step represented by S1701, a user firstly selects a non-contact mouse function mode in the portable multimedia device 100 by pressing a 'mouse button' 1210 of the input unit 130.

At this time, the processor 150 controls not only the start of the non-contact function mode but also the operations of the display unit 110, the camera unit 120, the video processing unit 125 and the light source 140. For example, the processor 150 directs the photographing of the camera unit 120 and direct to turn on the light source 140. The processor 150 converts an initial screen of the display unit 110 into a screen including the menu icon display area 1230. Accordingly, the light source 140 can emit light having a specific wavelength, and the camera unit 120 can continuously photograph a subject at intervals of a predetermined time.

In a step represented by S1702, the user locates pointing-means, such as a finger, in front of the camera unit 120. At this time, the camera unit 120 continuously photographs a subject at intervals of a predetermined time and outputs an inputted image. At this time, the movement (i.e. the moving locus) of the pointing-means by the user will be able to be identified through each video frame successively inputted (referring to a step represented by S1704).

In a step represented by S1703, the processor 150 recognizes the size and location of the area photographed with the pointing-means from the successively inputted video. In other words, the processor 150 firstly detects the area photographed with the pointing-means from the inputted video and recognizes the size and location of the detected area. Here, the detected area can be partitioned into the first detected area 1510 and the second detected area 1520 and recognizes the size and location per the first detected area and the second detected area 1520.

Here, the detection of the area photographed with the pointing-means can be performed by the method for extracting a luminance component having a predetermined range. This is the reason why the area photographed with the pointing-means, which is formed by the light, having a specific wavelength, emitted from the light source 140, reflected by the pointing-means, will have the brightness separately from other parts through the inputted video.

Accordingly, the video processing unit 125 can convert the inputted video into YUV type video data, in order to make it easy to detect the area photographed with the pointing-means. In other words, the processor 150 can determine the area photographed with the pointing-means by detecting a specific brightness (i.e. Y value), corresponding to the light emitted from the light source 140, from the inputted video converted into YUV type video data.

Of course, at this time, a specific video filter in the video processing unit 125 can be used to detect the area photographed with the pointing-means from the inputted video. For example, if a filter, allowing a wavelength having a predetermined range corresponding to the light emitted from the light source 140 to penetrate through it, is used, it can be possible to more exactly detect the area.

If the area photographed with the pointing-means is detected, the processor 150 computes the size and location of the detected area. Here, the location photographed with the pointing-means, as described above, can be set as a center point of the detected area. At this time, the mouse cursor can be displayed on a location in the menu icon display area 1230 corresponding to the center point detected from the inputted video.

However, it is not necessary that all pixels in an area determined as being photographed with the pointing-means must be used to compute the center point. For example, the center point can be estimated by selecting some (e.g. 50 pixels) pixels having a specific brightness component or according to the order of brightness from the brightest component and the center point of the selected pixels. Like this, although an estimated location of the finger's end part, the use of the non-contact mouse function in accordance with the present invention is not seriously affected by the estimated location. This is because the mouse cursor will be displayed on a location in the menu icon display area 1230 corresponding to the estimated location of the detected pointing-means. In other words, as the user looks at the location of the displayed mouse cursor, the user can move the pointing-means to be moved on the location displayed with a menu icon intended by the mouse cursor.

In a step represented by S1704, the processor 150 computes the moving locus of the pointing-means by using the successive change of the location and size of the detected area determined through earlier steps in each inputted video frame. In other words, the processor 150 can recognize the horizontal movement of the pointing-means by computing the location change of the center point of the detected area and the vertical movement of the pointing-means by computing the size increasing (or change rate) of the detected area. Since the method for computing the moving locus of the pointing-means is described through FIG. 14 and FIG. 15, the pertinent description will be omitted.

In a step represented by S1705, the processor 150 generates a control signal corresponding to the moving locus according to the horizontal movement or the vertical movement of the pointing-means. In other words, the processor 150 generates a cursor moving signal according to the horizontal movement of the pointing-means. The generated cursor moving signal is transferred to the menu icon display area 1230 of the display unit 110. The cursor, displayed on the menu icon display area 1230 according to the cursor moving signal, can move with drawing a locus corresponding to the horizontal moving locus of the pointing-means.

Also, the processor 150 generates a click signal according to the vertical movement of the pointing-means.

In a step represented by S1706, the processor 150 determines whether the vertical movement is performed by the clock signal from the left button of a mouse or a function identical to the click signal of the right button of the mouse is performed according to whether the area, detected with the pointing-means, is the first detected area or the second detected area. If the clock signal is generated by the size change of the second detected area, the option information of the selected menu icon can be displayed as the right button of the mouse is clicked in a step represented by S1709.

In a step represented by S1708, according to whether the area, detected with the pointing-means, is the first detected area and whether the size of the first detected area is repeated in a direction of being increased and then decreased at a predetermined rate, the generated click signal can be recognized as being selected with a menu function corresponding to the pertinent menu icon located with the mouse cursor in the menu icon display area 1230 like the click or double-click of the left button of the mouse, as being released with the selected menu icon in a step represented by S1711, or as being executed with the selected menu icon in a step represented by S1710.

Through the aforementioned operation, the user can take an action moving the pointing-means horizontally or vertically in front of the camera unit, in order to have the same effect as if the user a cursor to a desired menu icon and click the menu icon by using wire mouse.

As described above, the present invention can allow a user to more easily and quickly select a function by remote-controlling a menu function by use of a camera.

The present invention can also evoke user's interest, beyond the conventional simple function selecting method through the key button.

The present invention can also maximize making the most use of elements by allowing an equipped camera to be universally used.

The present invention can also reduce a manufacturing cost for a key pad and make its size minimized and its design varied by making the best use of the internal space of a digital device.

The present invention can also determine a moving width of a pointer according to the distance spaced with directing means.

In addition, the present invention can not only reduce a manufacturing cost of a digital device by removing a key pad but also make its size minimized and its design varied by making the best use of the internal space of the digital device, in accordance with a device and method having a non-contact mouse function.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. An image signal processor, comprising:
   a video data generating unit, generating video data corresponding to a video signal inputted from an image sensor; and
   an identity unit, detecting a location of a detected area formed by a predetermined light component from the video data in units of each frame, recognizing a moving locus of the detected area by comparing at least two continuous frames and generating and outputting corresponding change information,
   wherein the detected area is formed by light, reflected by a pointing-means and inputted, of light emitted to an outside by a light source.

2. The image signal processor of claim 1, wherein the change information is used as an input signal for function control and display control of a digital processing device including the image signal processor.

3. The image signal processor of claim 1, wherein the identity unit detects a size of the detected area, compares the at least two continuous frames and generates and outputs the change information corresponding to a size change of the detected area.

4. The image signal processor of claim 3, wherein if the size of the detected area is changed by the pointing-means moved in a first direction, the change information is recognized as a selecting command or an executing start command of an information item, corresponding to the moving locus, among a plurality of information items displayed on a display unit.

5. The image signal processor of claim 4, wherein if the size of the detected area is changed by the pointing-means moved in a second direction reversely with respect to the first direction, the change information is recognized as a selection releasing command of a selected information item.

6. The image signal processor of claim 5, wherein if the first direction and the second direction are vertical with respect to a camera unit and the size of the detected area is changed at a rate identical to or larger than a predetermined rate, it is recognized that the size of the detected area is changed.

7. The image signal processor of claim 3, wherein if the size of the detected area is increased and then decreased or is decreased and then increased at a rate identical to or larger than a predetermined rate, the change information is recognized as a selection command of an information item located with a mouse cursor or a selection releasing command of a selected information item among a plurality of information items displayed on a display unit.

8. The image signal processor of claim 3, wherein if the size of the detected area is increased and then decreased or is decreased and then increased repeatedly twice or more at a rate identical to or larger than a predetermined rate, the change information is recognized as an executing start command of an information item located with a mouse cursor among a plurality of information items displayed on a display unit.

9. The image signal processor of claim 3, wherein the identity unit detects a size of a first detected area and a second detected area in units of each frame corresponding to a plurality of pointing-means, respectively, compares the at least two continuous frames and generates and outputs change information corresponding to size changes of the first detected area and the second detected area.

10. The image signal processor of claim 9, wherein if the size of the first detected area is increased and then decreased or is decreased and then increased at a rate identical to or larger than a predetermined rate, the change information is recognized as a selection command of an information item located with a mouse cursor or a selection releasing command of a selected information item among a plurality of information items displayed on a display unit.

11. The image signal processor of claim 9, wherein if the size of the second detected area is increased and then decreased or is decreased and then increased at a rate identical to or larger than a predetermined rate, the change information is recognized as an option information displaying command of an information item located with a mouse cursor among a plurality of information items displayed on a display unit.

12. The image signal processor of claim 9, wherein if the size of the first detected area is increased and then decreased or is decreased and then increased repeatedly twice or more at a rate identical to or larger than a predetermined rate, the change information is recognized as an executing start command of an information item located with a mouse cursor among a plurality of information items displayed on a display unit.

13. The image signal processor of claim 3, wherein the size of the detected area is an area size of a figure formed by an outline of the detected area or the number of a pixel included in the detected area.

14. An application processor, comprising:
    a receiving unit, receiving video data generated corresponding to an outside video signal from an image signal processor; and
    an identity unit, detecting a location of a detected area formed by a predetermined light component from the video data in units of each frame, recognizing a moving locus of the detected area by comparing at least two continuous frames and generating and outputting corresponding change information,
    wherein the detected area is formed by light, reflected by a pointing-means and inputted, of light emitted to an outside by a light source.

15. The application processor of claim 14, wherein the change information is used as an input signal for function control and display control of a digital processing device including an image signal processor and the application processor.

16. The application processor of claim 14, wherein the identity unit detects a size of the detected area, compares the at least two continuous frames and generates and outputs the change information corresponding to a size change of the detected area.

17. The application processor of claim 16, wherein if the size of the detected area is changed by the pointing-means moved in a first direction, the change information is recognized as a selecting command or an executing start command of an information item, corresponding to the moving locus, among a plurality of information items displayed on a display unit.

18. The application processor of claim 17, wherein if the size of the detected area is changed by the pointing-means moved in a second direction reversely with respect to the first direction, the change information is recognized as a selection releasing command of a selected information item.

19. The application processor of claim 18, wherein if the first direction and the second direction are vertical with respect to a camera unit and the size of the detected area is changed at a rate identical to or larger than a predetermined rate, it is recognized that the size of the detected area is changed.

20. The application processor of claim 16, wherein if the size of the detected area is increased and then decreased or is decreased and then increased at a rate identical to or larger than a predetermined rate, the change information is recognized as a selection command of an information item located with a mouse cursor or a selection releasing command of a selected information item among a plurality of information items displayed on a display unit.

21. The application processor of claim 16, wherein if the size of the detected area is increased and then decreased or is decreased and then increased repeatedly twice or more at a rate identical to or larger than a predetermined rate, the change information is recognized as an executing start command of an information item located with a mouse cursor among a plurality of information items displayed on a display unit.

22. The application processor of claim 16, wherein the identity unit detects a size of a first detected area and a second detected area in units of each frame corresponding to a plurality of pointing-means, respectively, compares the at least two continuous frames and generates and outputs change information corresponding to size changes of the first detected area and the second detected area.

23. The application processor of claim 22, wherein if the size of the first detected area is increased and then decreased or is decreased and then increased at a rate identical to or larger than a predetermined rate, the change information is recognized as a selection command of an information item located with a mouse cursor or a selection releasing command of a selected information item among a plurality of information items displayed on a display unit.

24. The application processor of claim 22, wherein if the size of the second detected area is increased and then decreased or is decreased and then increased at a rate identical to or larger than a predetermined rate, the change information is recognized as an option information displaying command of an information item located with a mouse cursor among a plurality of information items displayed on a display unit.

25. The application processor of claim 22, wherein if the size of the first detected area is increased and then decreased or is decreased and then increased repeatedly twice or more at a rate identical to or larger than a predetermined rate, the change information is recognized as an executing start command of an information item located with a mouse cursor among a plurality of information items displayed on a display unit.

26. The application processor of claim 16, wherein the size of the detected area is an area size of a figure formed by an outline of the detected area or the number of a pixel included in the detected area.

27. A method of a digital processing device having a photographing function that performs a non-contract mouse function, the method comprising:
 a light source emitting light to an outside;
 a camera unit generating and outputting a video signal corresponding to an external video;
 a video data generating unit generating video data corresponding to the video signal; and
 an identity unit detecting a location of a detected area formed by light, reflected by a pointing-means and inputted, of the light emitted from the video data in units of each frame, recognizing a moving locus of the detected area by comparing at least two continuous frames and generating and outputting corresponding change information,
 wherein the change information that any one of a plurality of information items, displayed on a display unit, is selected, or a mouse cursor moving corresponding to the change information is displayed.

28. The method of claim 27, further comprising the identity unit detecting the size of the detected area, comparing the at least two continuous frames and generating and outputting the change information corresponding to a size change of the detected area.

29. The method of claim 28, wherein if the size of the detected area is changed by the pointing-means moved in a first direction, the change information is recognized as a selecting command or an executing start command of an information item, corresponding to the moving locus, among a plurality of information items displayed on the display unit.

30. The method of claim 29, wherein if the size of the detected area is changed by the pointing-means moved in a second direction reversely with respect to the first direction, the change information is recognized as a selection releasing command of a selected information item.

31. The method of claim 30, wherein if the first direction and the second direction are vertical with respect to the camera unit and the size of the detected area is changed at a rate identical to or larger than a predetermined rate, it is recognized that the size of the detected area is changed.

32. The method of claim 28, wherein if the size of the detected area is increased and then decreased or is decreased and then increased at a rate identical to or larger than a predetermined rate, the change information is recognized as a selection command of an information item located with a mouse cursor on the display unit or a selection releasing command of a selected information item.

33. The method of claim 28, wherein if the size of the detected area is increased and then decreased or is decreased and then increased repeatedly twice or more at a rate identical to or larger than a predetermined rate, the change information is recognized as an executing start command of an information item located with a mouse cursor on the display unit.

34. The method of claim 28, wherein the identity unit detects a size of a first detected area and a second detected area in units of each frame corresponding to a plurality of pointing-means, respectively, compares the at least two continuous frames and generates and outputs change information corresponding to size changes of the first detected area and the second detected area.

35. The method of claim 34, wherein if the size of the first detected area is increased and then decreased or is decreased and then increased at a rate identical to or larger than a predetermined rate, the change information is recognized as a selection command of an information item located with a mouse cursor on the display unit or a selection releasing command of a selected information item.

36. The method of claim 34, wherein if the size of the second detected area is increased and then decreased or is decreased and then increased at a rate identical to or larger than a predetermined rate, the change information is recognized as an option information displaying command of an information item located with a mouse cursor among a plurality of information items displayed on the display unit.

37. The method of claim 34, wherein if the size of the first detected area is increased and then decreased or is decreased and then increased repeatedly twice or more at a rate identical to or larger than a predetermined rate, the change information is recognized as an executing start command of an information item located with a mouse cursor on the display unit.

38. The method of claim 27, wherein the light source emits light having a predetermined wavelength or luminance to the outside.

39. The method of claim 38, wherein the identity unit detects a location of the detected area from the video data by using the wavelength or the luminance.

40. The method of claim 28, wherein the size of the detected area is an area size of a figure formed by an outline of the detected area or the number of a pixel included in the detected area.

41. The method of claim 27, wherein the light source, the camera unit and the identity unit periodically and repeatedly performs the corresponding steps until a location of the detected area is detected.

* * * * *